United States Patent
Yuyama et al.

[11] Patent Number: 5,988,858
[45] Date of Patent: Nov. 23, 1999

[54] METHOD AND APPARATUS FOR DELIVERING DRUGS

[75] Inventors: Shoji Yuyama; Hiroshi Nose; Takuo Morimoto, all of Toyonaka, Japan

[73] Assignee: Kabushiki Kaisha Yuyama Seiksakusho, Osaka, Japan

[21] Appl. No.: 09/021,864

[22] Filed: Feb. 11, 1998

Related U.S. Application Data

[63] Continuation-in-part of application No. 08/650,971, May 21, 1996, abandoned.

[30] Foreign Application Priority Data

Jun. 9, 1995 [JP] Japan .................................... 7-143222

[51] Int. Cl.$^6$ .......................... B07C 17/00; G06F 17/00; G07F 7/00; B65G 1/00
[52] U.S. Cl. ............................ 364/478.18; 364/478.17; 364/478.14; 364/478.13; 364/478.01
[58] Field of Search ........................ 364/478.01, 478.1, 364/478.13, 478.14, 478.16, 478.18, 478.02, 478.03, 478.04, 478.06, 478.08; 414/268, 273

[56] References Cited

U.S. PATENT DOCUMENTS

| | | | |
|---|---|---|---|
| Re. 33,416 | 10/1990 | Konishi et al. ..................... | 364/478.05 |
| 4,415,975 | 11/1983 | Burt ......................................... | 414/273 |
| 4,546,901 | 10/1985 | Buttarazzi . | |
| 4,821,197 | 4/1989 | Kenik et al. ............................ | 364/478 |
| 4,847,764 | 7/1989 | Halvorson . | |
| 4,971,513 | 11/1990 | Bergerioux et al. ..................... | 414/285 |
| 5,036,462 | 7/1991 | Kaufman et al. . | |
| 5,208,762 | 5/1993 | Charhut et al. ........................... | 364/478 |
| 5,216,618 | 6/1993 | Arita et al. .......................... | 364/478.03 |
| 5,292,029 | 3/1994 | Pearson . | |
| 5,323,327 | 6/1994 | Carmichael et al. ............... | 364/478.03 |
| 5,329,459 | 7/1994 | Kaufman et al. . | |
| 5,379,229 | 1/1995 | Parsons et al. .......................... | 364/478 |
| 5,468,110 | 11/1995 | McDonald et al. ..................... | 364/478 |
| 5,502,944 | 4/1996 | Kraft . | |
| 5,533,606 | 7/1996 | Yuyama .................................. | 198/349 |
| 5,593,267 | 1/1997 | McDonald et al. ..................... | 414/273 |
| 5,597,995 | 1/1997 | Williams et al. ................... | 364/478.13 |
| 5,599,154 | 2/1997 | Holscher et al. ....................... | 414/268 |
| 5,604,692 | 2/1997 | Yuyama ............................... | 364/479.1 |
| 5,669,748 | 9/1997 | Knudsen, Jr. ........................... | 414/273 |
| 5,690,463 | 11/1997 | Yoshie ..................................... | 414/273 |
| 5,720,157 | 2/1998 | Ross ....................................... | 414/273 |

*Primary Examiner*—William E. Terrell
*Assistant Examiner*—Wonki K. Park
*Attorney, Agent, or Firm*—Weneroth, Lind & Ponack, L.L.P.

[57] ABSTRACT

An apparatus and control method for feeding medications in which processing units, which can prepare drugs, non-drug articles and drug-related articles, are provided along a carrier feed line, and in which carriers for respective patients are fed on the feed line in the order in which preparations for carriers, preparations for medications, and preparation for receiving carriers are all finished so that a large amount of medications can be collected and delivered by carts to a plurality of wards in a hospital with high efficiency. When patient data is entered in a host computer, at least one of the processing units corresponding to this data is activated to prepare medications. When preparations in all of the processing units, tray feed units, and tray receiving unit have been made, a corresponding tray is fed on the conveyor to collect medications and is then loaded into a predetermined one of a plurality of carts.

8 Claims, 23 Drawing Sheets

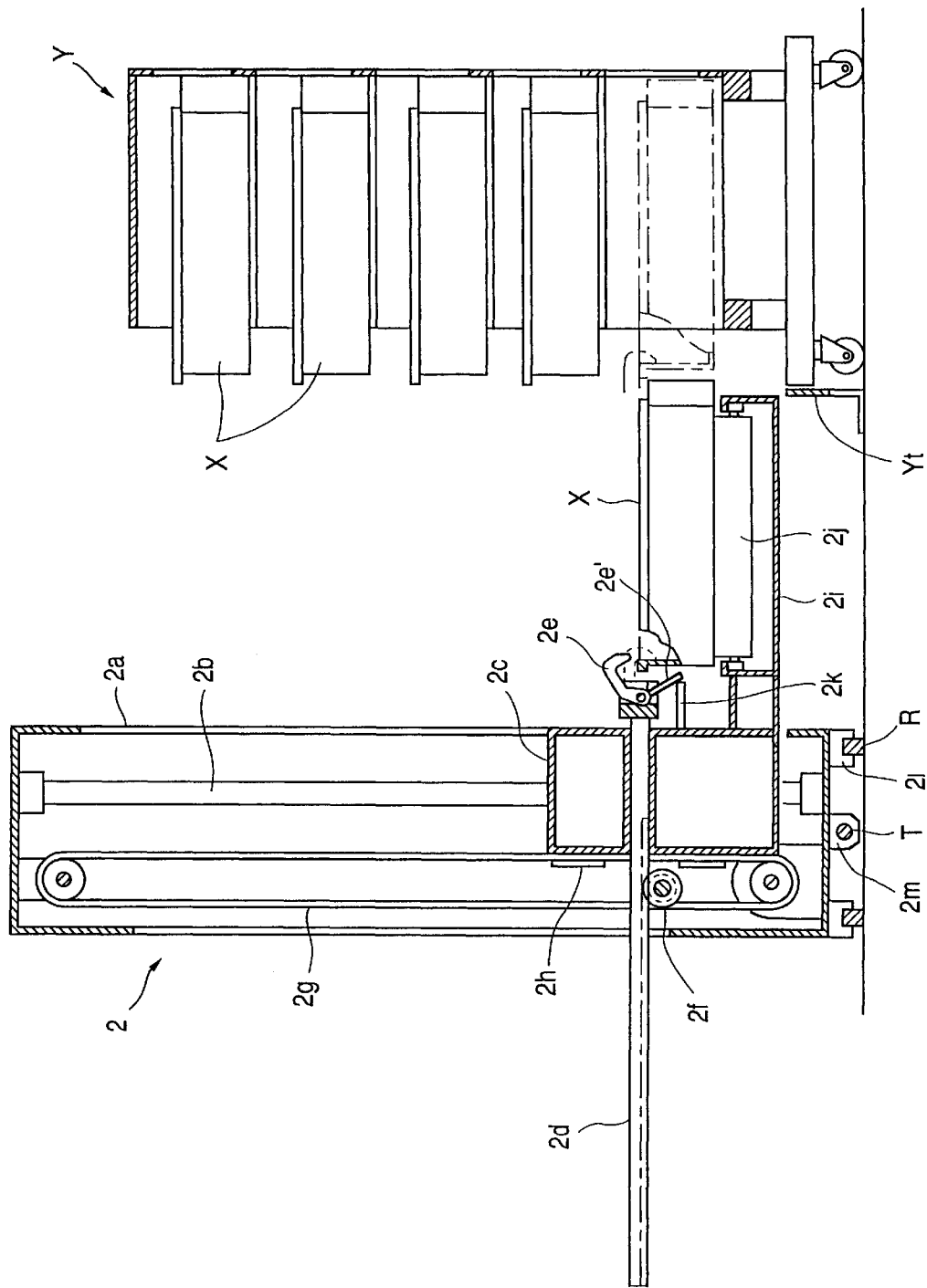

FIG. 16

| PATIENT CODE | WARD | PROCESSING UNIT | | | | | | | | | | | | | | | COM-PLETE | COUNTER (HOST COMPUTER) | | | |
|---|---|---|---|---|---|---|---|---|---|---|---|---|---|---|---|---|---|---|---|---|---|
| | | PC | PD | TB | SL | AP | CC | OM | CL | OT | PH | GA | US | IN | CT | ET | | A(02) | B(69) | C(24) | D(28) |
| 100216 | A | X | A62 A82 | | | D142 D123 | E62 | | | | | | | L133 | | | | | | | |
| 100211 | A | X | | B261 | | D862 D821 | E63 | | G08 G08 | | | | | L333 | M98 | N12 | 1 | 01 | | | |
| 201001 | B | X | A63 A62 | | C03 | D512 D555 D762 | E21 | | | H36 | | J18 J09 | K263 K620 | L781 | | | 3 | | 68 | | |
| 303011 | A | X | | B623 B221 | | | | | | | | | | | | | 2 | 00 | | | |
| 100210 | C | X | A71 A21 | B636 B620 | | D263 | | | G01 | | | J09 | | | M10 | | 4 | | | 23 | |
| 100511 | D | O | A02 | B002 | | | | | | | | | | L691 L251 | | | 5 | | | | |
| 100602 | A | X | | | C06 | D110 | | | G08 | H22 H10 | I03 | J09 | K389 | | | | 7 | | | | |
| 303015 | C | O | | B762 | | | | | | H07 H02 | | | K691 K221 | | | | ⑥ | | | 22 | |
| 203221 | A | X | A01 | | | D989 | | | G13 | H18 | | | | | | | 8 | 00 | | | |
| 303112 | B | X | A03 | B321 | | D153 | | | | | | J03 | K389 | | | | | | | | |
| 303421 | B | X | | B342 B921 | | D424 | | F16 F09 | | H26 | | J08 | | L389 | | N09 | | | 67 | | 27 |

FIG. 17

| PATIENT CODE | WARD | PROCESSING UNIT STOPPER | | | | | | | | | | | | | | | | DISTRIBUTING STATION STOPPER | | | | COUNTER | | | |
|---|---|---|---|---|---|---|---|---|---|---|---|---|---|---|---|---|---|---|---|---|---|---|---|---|---|
| | | S00 | S1 | S2 | S3 | S4 | S5 | S6 | S7 | S8 | S9 | S10 | S11 | S12 | S13 | S14 | S15 | S16 | S17 | S18 | S19 | A | B | C | D |
| 100119 | A | | | 3 | | 2 | | | | 1 | | 2 | | | 2 | | | OK | OK | OK | OK | 07 | | | 24 |
| 100182 | B | | 1 | | 1 | | 2 | | | | 1 | | 1 | | | 1 | | | | | | | 71 | | |
| 100211 | A | | | | 1 | 3 | 2 | | | 2 | | | | | 1 | 1 | 1 | | | | | | | | |
| 303011 | A | | | | 2 | | | | ▨ | | | | | | | | | | | | | | | | |
| 201001 | B | | | 2 | | 1 | 3 | 1 | | | 1 | | 2 | 2 | 1 | 1 | | | | | | | | | |
| 100210 | C | | | 2 | 2 | | | | | 1 | 1 | | | | | | | | | | | | | | |
| 100511 | D | | 1 | 1 | 1 | ▨ | | | | | 2 | | 2 | | 1 | | | | | | | | | | |
| 303015 | C | | 1 | 1 | ▨ | | 1 | | | | | | | 1 | | | | | | | | | | | |
| 303112 | B | | | 1 | 1 | | | | | | | | 1 | | | | | ▶ | ▶ | ▶ | ▶ | | | | |

METHOD AND APPARATUS FOR DELIVERING DRUGS

This application is a continuation-in-part of Ser. No. 08/650,971 filed May 21, 1996 now abandoned.

BACKGROUND OF THE INVENTION

This invention relates to a method and apparatus for delivering drugs prepared in, for example, a hospital pharmacy and medical instruments such as injectors to nurse stations or operating rooms in different wards of a hospital or to different hospitals.

Carrier devices for taking articles out of a storage room and delivering them to predetermined positions by putting them in carriers are used in various industrial fields. In a hospital, especially in a big hospital, drugs prepared based on prescriptions issued by doctors are handed to patients or delivered to nurse stations in respective wards after being inspected by pharmacists. Thus, it is difficult to use the above-mentioned conventional carrier devices as drug carrier devices in hospitals.

In many hospitals, in order to eliminate the necessity for hospital pharmacists to have to walk to a drug storage room to fetch necessary drugs from the shelf, drug pouches for powdered drugs and tablets are put in buckets which run on a conveyor line installed in a pharmacy and are collected in one place. After checking if the drugs are consistent with prescriptions, they are handed to patients.

But by using an automatic injection dispenser disclosed in Unexamined Japanese Patent Publication 3-69537, it is possible to prepare drugs more efficiently. The dispenser disclosed in this publication has a temporary tray storage shelf, a shelf for storing transfusion fluids, a shelf for single items, and an ampule storage shelf that are arranged in this order in a drug storage room. Each shelf has a means for discharging drugs or other drug-related articles from the shelf into a tray. Drugs and other products are discharged from the respective shelves into trays and are then sent to a predetermined place.

Examined Japanese Utility Model Publication 6-14753 discloses a device for storing and discharging small medical articles such as ampules. In this device, ampules are stored in cartridges so that they can be easily stored and taken out. Ampules can be taken out of any desired cartridge by a discharging means and put in trays. The trays are then sent to an inspecting station and then to a discharging point.

A similar device is disclosed in Unexamined Japanese Patent Publication 2-28406 too.

These conventional devices have a means for collecting or selecting drugs and other medications which is provided in the feed line along which drugs and other medications taken out of a drug storage room are fed to a predetermined place in a pharmacy, and after being inspected by pharmacists, they are sent out of the pharmacy. But none of these devices has a means for delivering medications collected to a predetermined one of a plurality of wards in a hospital or to a predetermined one of a plurality of hospitals.

In most cases, drugs collected in a pharmacy and inspected by pharmacists are put in drug pouches and are physically handed to patients.

In big hospitals, drugs and non-drug articles prepared for patients are large in kinds, numbers and quantities.

While powdered drugs, tablets, liquid drugs and external drugs account for most drugs administered to outpatients, drugs administered to inpatients are much more varied in kinds, including ampules, vials, blood and other fluids for transfusion, which are used according to the instructions of doctors. Also, non-drug items such as injectors and dressings are also needed.

When necessary drugs and non-drug articles for a plurality of patients have been prepared and collected, they are checked by pharmacists or other authorized people, put in trays and sent to the respective nurse stations.

Conventional drug carrier devices make it possible to efficiently collect medications from an inspecting station. But none of them has a means for automatically sorting and delivering medications to respective nurse stations. Thus, they have to be manually sorted and delivered to nurse stations.

An object of this invention is to provide a control method for feeding medications in which processing units, which can prepare drugs, non-drug articles and drug-related articles and other items that are needed in hospitals, are provided along a carrier feed line, and in which carriers for respective patients are fed on the feed line in the order in which preparations for carriers, preparations for medications and preparation for receiving carriers are all finished so that a large amount of medications can be collected and delivered to a plurality of wards in a hospital with high efficiency.

SUMMARY OF THE INVENTION

According to this invention, there is provided a method of controlling the feeding of medications comprising the steps of feeding data including patients' names and patient code data, prescription-based drug preparation data, and data on non-drug articles and drug-related items to a logic control circuit, controlling one or some of a drug processing unit, a processing unit for non-drug articles and a processing unit for drug-related items that are arranged along a feed line to prepare drugs, non-drug articles and drug-related items that are needed for each patient, setting carriers in a carrier feed unit provided at the feed end of the feed line, preparing to accept carriers in a distribution station provided at the delivery end of the feed line, starting a carrier for each patient when all the necessary completion signals are received to collect the drugs, non-drug articles and drug-related items for each patient in the carrier and feeding them to the distribution station.

In this control method, it is preferable to provide a plurality of carrier receiving units in the distribution station, feed carriers for respective patients in the order in which preparations for feeding carries, preparations for drugs, non-drug articles and drug-related items in the processing units, and preparations for accepting carriers are finished, and loading each carrier into a predetermined one of the carrier receiving units based on patient data stored in the logic control circuit.

Either of the above control methods may further comprise the steps of attaching an indicator that shows a patient's name or code and drug preparation data to each carrier at the feed end, reading the data stored in each indicator with a data reader provided near the distribution station, and loading each carrier into a predetermined one of the carrier receiving units at a position based upon the data stored in each indicator.

When the necessary data including patients' names or codes and drug preparation data are sent to the logic control circuit, it starts preparations for feeding carriers on the feed line, preparations for discharging medications prepared in the respective processing units, and preparations for receiving carriers.

These preparations are started in the order in which the patient data is entered in the logic control circuit. But preparations in the respective processing units may not necessarily finish in this order. For example, preparations for the drugs for a certain patient may be considerably delayed.

If many carriers are loaded into the carrier receiving units one after another, they will eventually become full of carriers, making it impossible to receive any more carriers.

According to the present invention, a carrier is fed on the feed line only after all preparations have been made in the carrier feed unit and in the processing units. With this arrangement, the carrier will never be stopped for an unduly long time at any processing unit due to a delay in the preparation for drugs in this unit. It is thus possible to smoothly collect drugs in trays and send them to a distribution station in a minimum time period.

In the control method according to this invention, drugs are not inspected while they are being fed automatically on the feed line. Drugs are inspected after being delivered to nurse stations in respective hospital wards by pharmacists. That is, this control method is used in what is known as a satellite pharmacy.

In the arrangement in which a plurality of carrier receiving units are provided in the distribution station, each carrier is received in a predetermined one of the carrier receiving units based on patient data stored in the logic control circuit.

In another arrangement, patient data is read from an indicator attached to each carrier near the distribution station with a data reader. Each carrier is loaded into a predetermined one of the carrier receiving units at a position based upon the data stored in each indicator. Thus, it is possible to load each carrier in each carrier receiving unit at a position most convenient for delivering the carrier to a predetermined hospital ward.

BRIEF DESCRIPTION OF THE DRAWINGS

The features and objects of the present invention will become apparent from the following description made with reference to the accompanying drawings, in which:

FIG. 4 is a sectional view taken along line IV—IV of FIG. 3;

FIG. 16 is a graph showing the data stored in the host computer;

FIG. 17 is a graph showing the data stored in each sequencer;

DETAILED DESCRIPTION OF THE PREFERRED EMBODIMENT

Embodiments of this invention are described with reference to the drawings.

Figure 1:
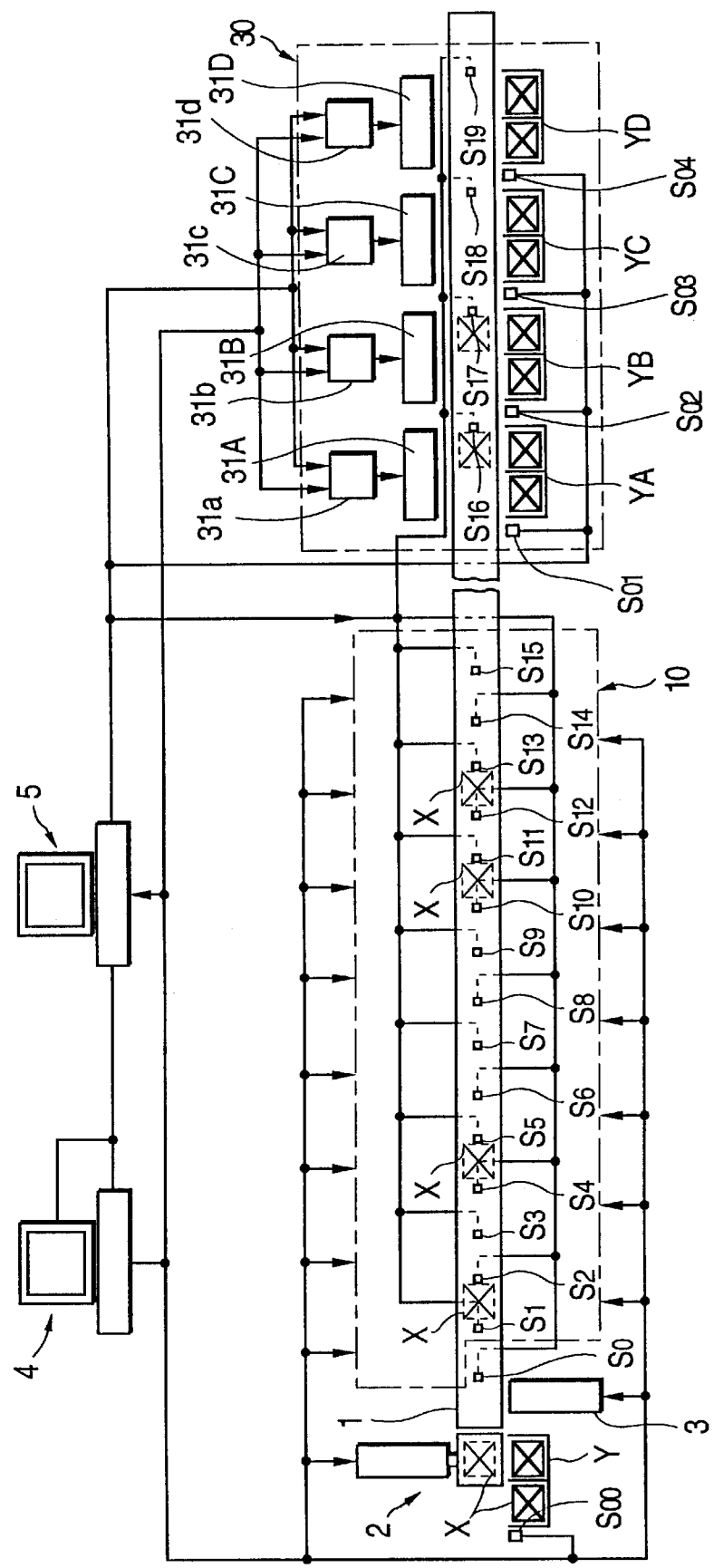
FIG. 1 is a schematic block diagram of a feed line of a first embodiment.

FIG. 1 is a block diagram of the entire drug carrier system of the first embodiment. The drug carrier system of this embodiment is used to feed trays X carrying drugs, non-drug articles and other drug-related items (hereinafter sometimes referred to as medications) to a predetermined terminal, put them in carts Y and distribute them to designated wards in the hospital.

The feed line comprises a straight or looped conveyor 1 for feeding open-topped trays X. The conveyor may be a belt conveyor and it comprises a plurality of rollers 1a arranged at predetermined intervals or may be other means capable of feeding trays X. The conveyor used in this embodiment is the type comprising a plurality of rollers 1a.

Near the upstream end of the conveyor 1, a tray feed unit 2 and an ID dispensing unit 3 are provided. Arranged along the feed line are a plurality of processing units 10 for processing various medications and dropping them into trays being fed on the conveyor. A distribution station 30 is provided a predetermined distance from the upstream end of the conveyor. These units are controlled automatically by a host computer 4 and a sequencer 5. The processing units 10 are encased in a common housing.

Figure 2:
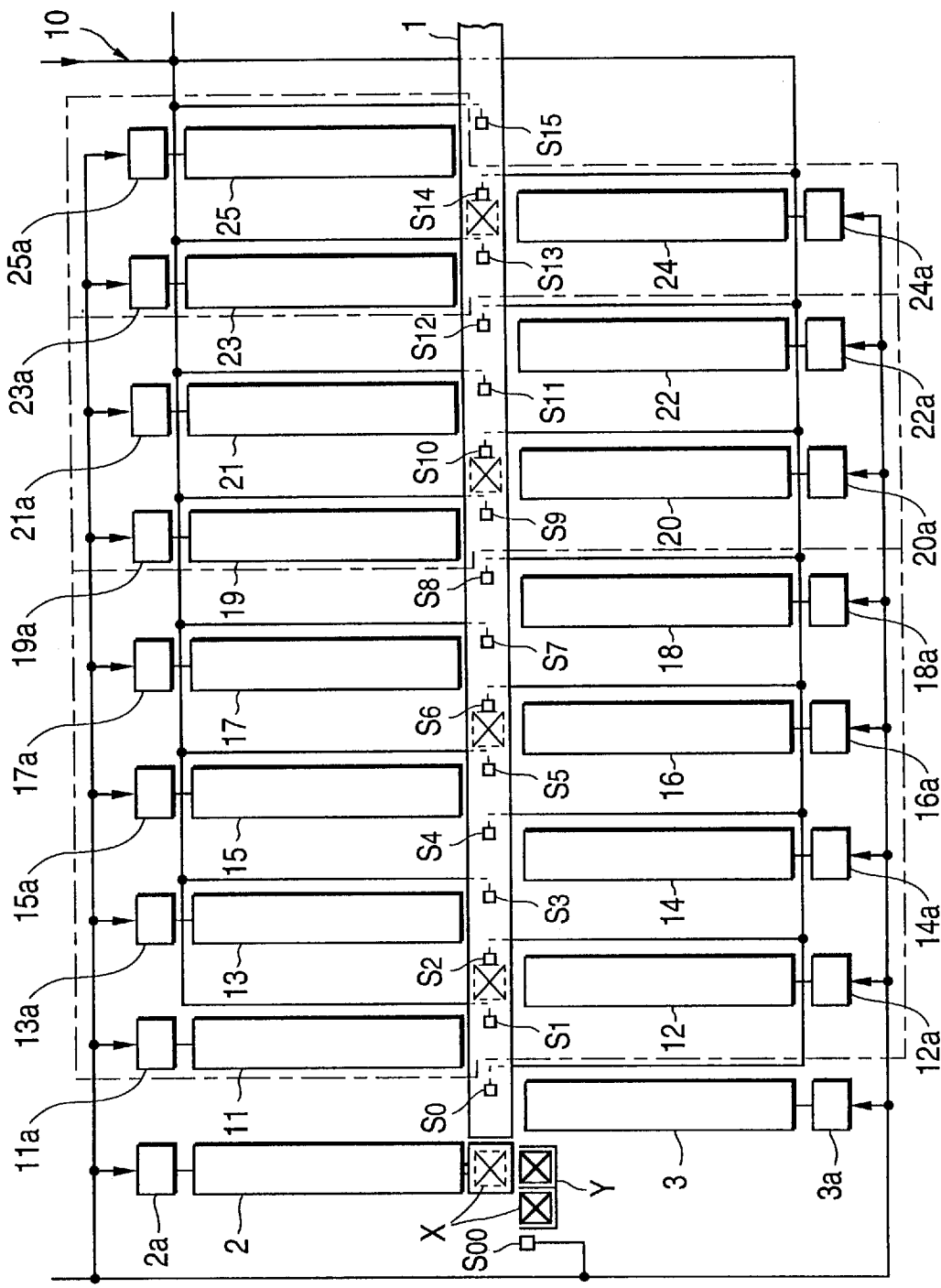
FIG. 2 is a partial block diagram of the processing units of FIG. 1.

FIG. 2 is a control block diagram for the processing units 10. Numeral 11 designates a drug bag printer which is controlled by a sequencer 11a.

Numerals 12–17 indicate processing units for powdered drugs, tablets, liquid drugs, ampules, transfusion fluid containers and external drugs, respectively. Their sequencers are numbered 12a–17a, respectively. The processing units of the embodiment are all of the same type and are provided independently of one another. But according to the kind of drugs to be processed, a single unit may be used to perform some of the above processes.

Numeral 18 designates a transfusion fluid refrigerating unit. Its sequencer is numbered 18a. Numerals 19–22 indicate containers for dressing, physiological expendables, sterilizing cotton and disposable utensils, respectively. They are controlled by sequencers 19a–22a. Numerals 23–25 indicate containers for medical instruments (such as injectors), cutters (such as scissors) and other items, respectively. Their sequencers are numbered 23a–25a.

S0, S1–S15 and S16–S19 are stoppers for stopping trays X on the feed line. They are mechanical stoppers that stop trays by protruding upward. Position sensors S00, S01–S04 detect that a cart Y has been set in a predetermined position.

Figure 3:
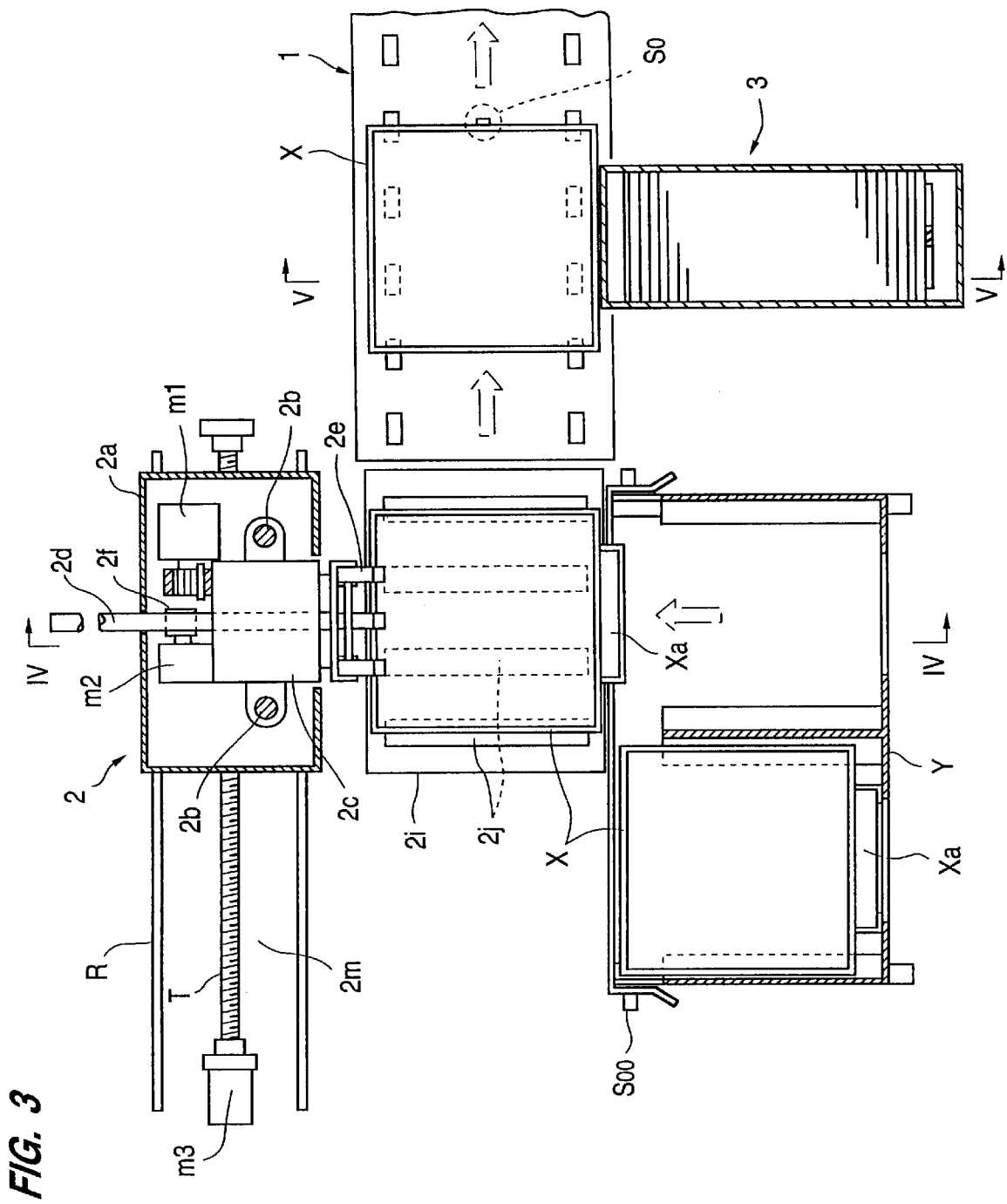
FIG. 3 is a detailed plan view of the feed end of the feed line.

FIG. 3 schematically shows the position of the tray feed unit 2 relative to the conveyor 1 when a tray is being moved onto the conveyor. The following description is made while referring to this figure and further to FIGS. 4 and 5. A cart Y is set in position by a fixing means Yt so as to face the tray feed unit 2. A cart Y can store trays X in a plurality of (two in the example shown) vertical columns and in a plurality of (five in the example shown) rows. A tray in a predetermined column and row can be pulled out of the cart by holding it with a gripper 2e of the tray feed unit 2 and placed on an apron 2i. The tray X on the apron is pushed onto the conveyor by rotating rollers 2j.

As shown in FIGS. 3 and 4, the tray feed unit 2 comprises a vertically elongated box-shaped frame 2a and a block 2c vertically movable along a guide rod 2b. The gripper 2e is mounted on the tip of a horizontal supporting rod 2d extending through the block 2c.

The block 2c is fixed to one side of an endless belt 2g by a fixing member 2h and driven up and down by a motor m1. The supporting rod 2d has rack teeth on its bottom surface. The supporting rod 2d is moved horizontally toward and away from the cart Y by a motor m2 through a pinion 2f meshing with the rack teeth formed on the bottom of the rod 2d.

The tray feed unit 2 has wheels 21 on the bottom so that it can be moved along rails R laid on the floor. It also has a protrusion 2m on the bottom which engages a threaded shaft T provided on the floor. By turning the shaft T with a motor m3 coupled thereto, the tray feed unit 2 can be moved.

Figure 5A:
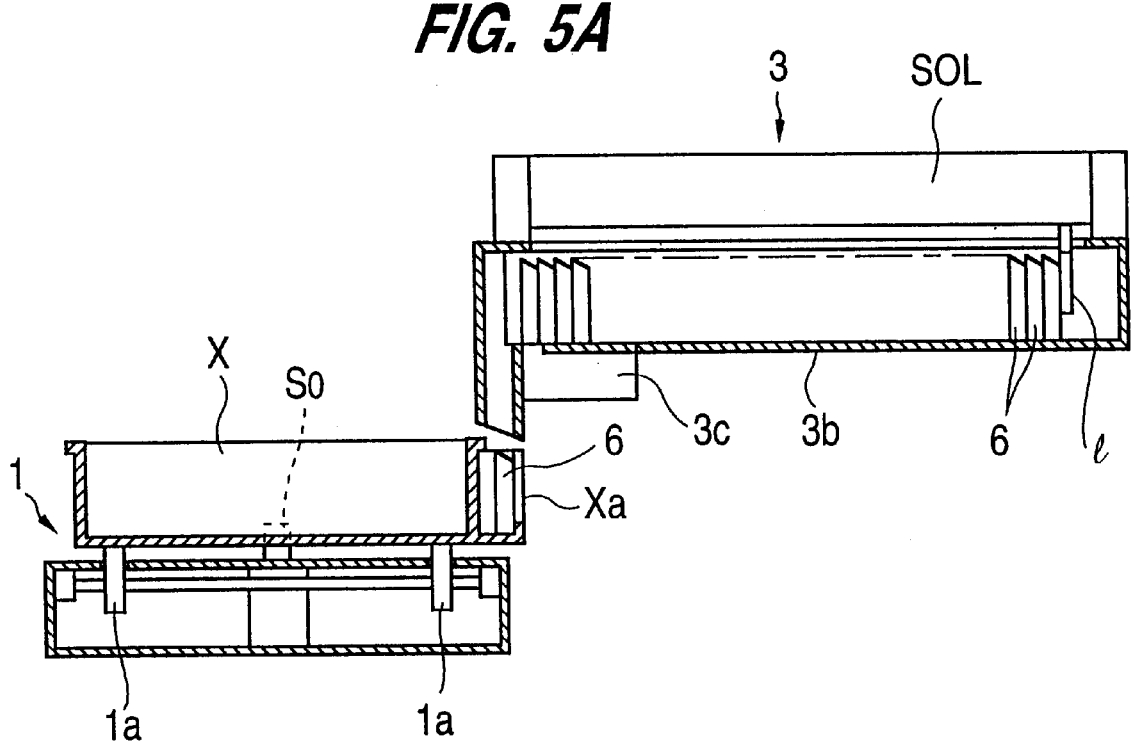
FIGS. 5A and 5B are a sectional view taken along line V—V of FIG. 3, and its perspective view, respectively.
Figure 5B:
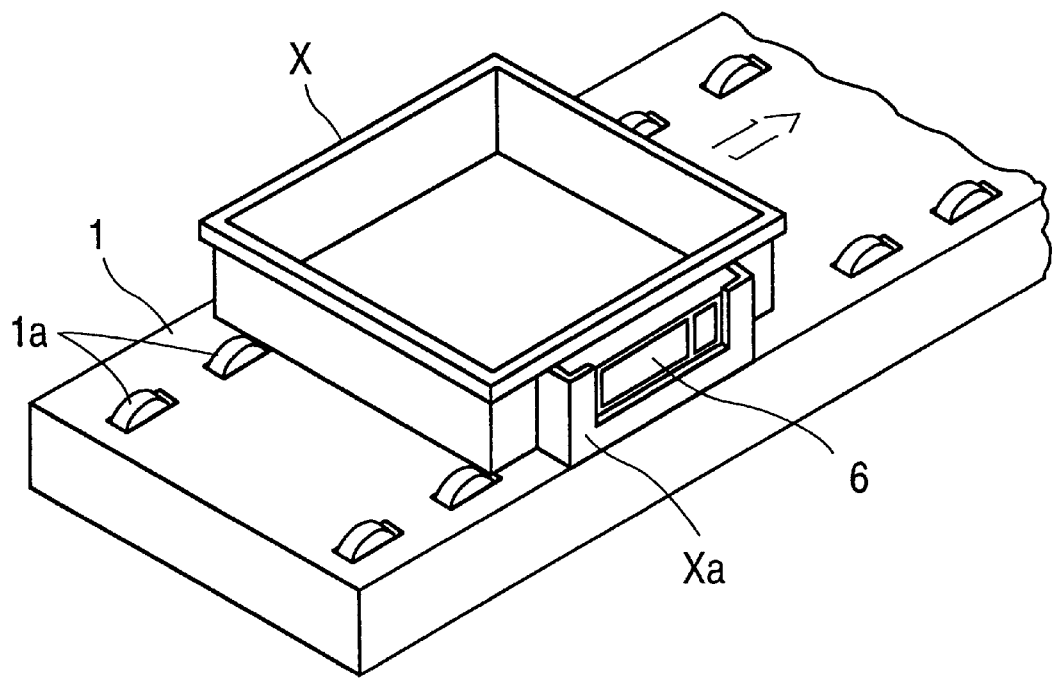

FIG. 5 is a sectional view taken along line V—V of FIG. 3. The ID dispensing unit 3 has an indicator feed means 3b that stores many ID indicators 6. It has at one corner thereof a data transmitter 3c for writing patient data into each ID indicator 6. An arm of a solenoid SOL provided over the transmitter 3c picks up an ID indicator for each patient and drops it through an L-shaped end of the indicator feed means 3b into a pocket Xa of each tray The stopper S0 is provided along the line V—V in FIG. 3 and near the center of the conveyor 1 to stop each tray X at this point. When a tray X is moved to this point, the stopper S0 protrudes to stop it. An ID indicator is dropped into its pocket Xa in this state.

Figure 6A:
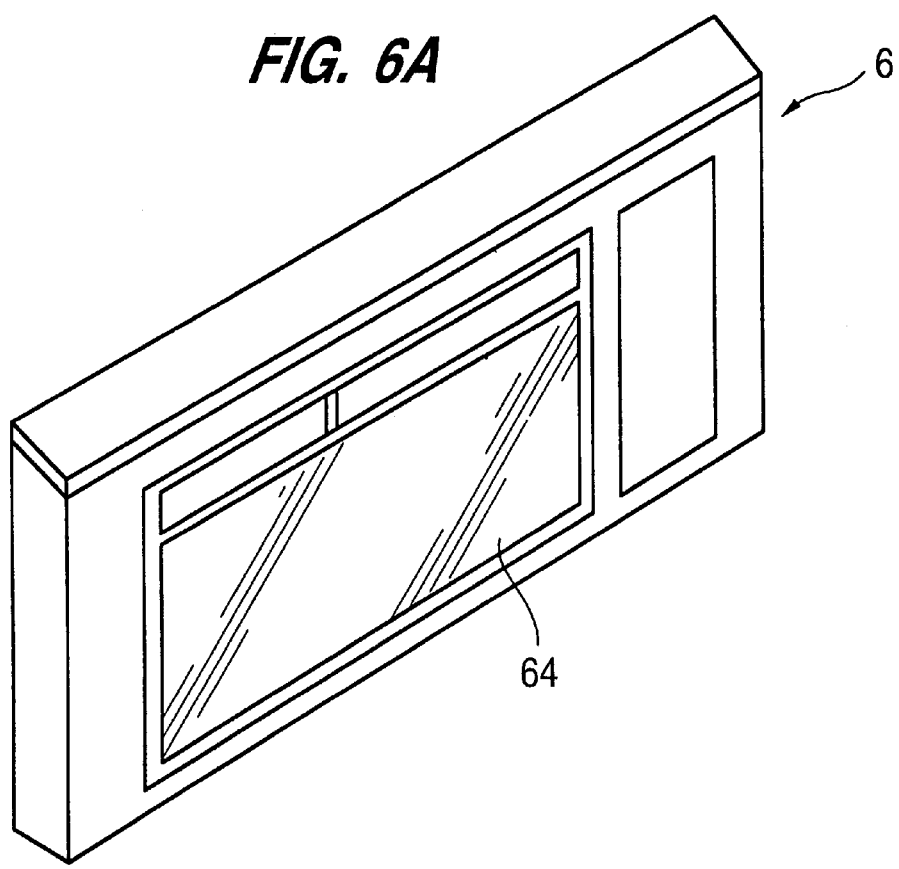
FIGS. 6A and 6B are an outer perspective view of an ID indicator, and a block diagram of its internal circuit, respectively.
Figure 6B:
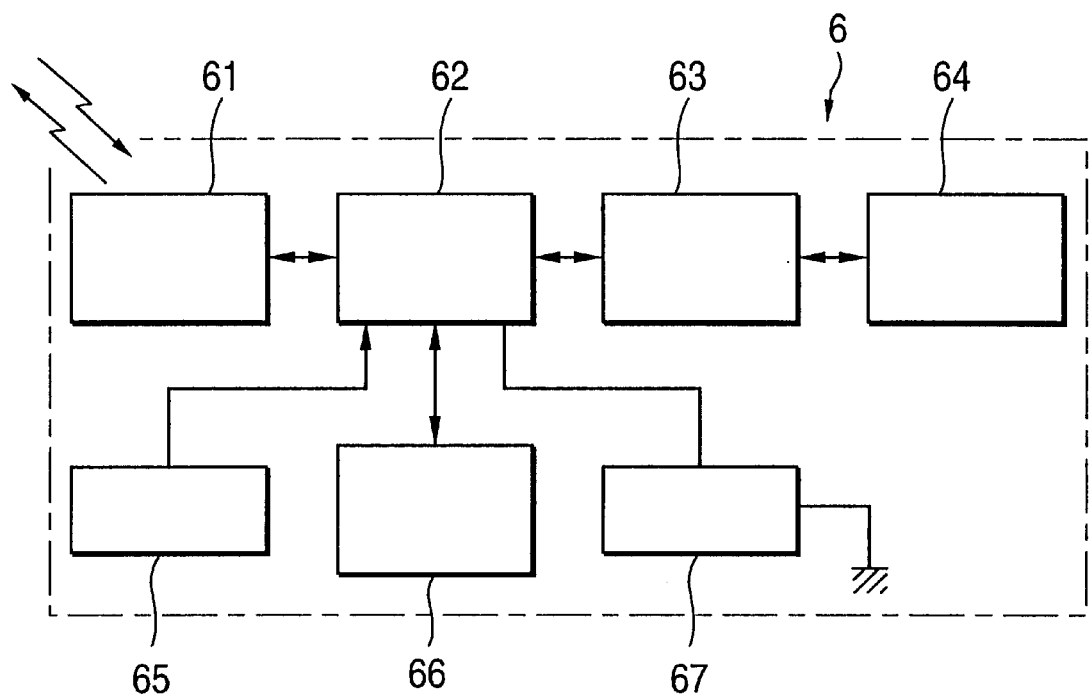

Referring to FIG. 6B, an ID indicator 6 has a memory. When data transmitted through a signal transmitter/receiver 61 is written in the memory 66, a control unit 62 activates a display actuator 63 to indicate this data on a display 64 (such as CLD or LED). The ID indicator also has a key input port 65. Its power source is indicated at 67. The power source 67 may be a solar battery provided at the top of the indicator.

The signal transmitter/receiver 61 shown is a light signal transmitter/receiver. The light signals used are laser beam signals or infrared beam signals. If infrared beam signals are used, the ID indicator may have an IDX card provided integrally on its body. Data written into each indicator by means of its signal transmitter/receiver 61 include a patient's code number, a bucket number and prescription data written on a prescription. This data are indicated on the display 64.

Instead of light signals, wave signals may be used to represent this data. In such a case, a printer for printing patients' code numbers, buckets numbers, prescription data, etc. are used instead of the ID dispensing unit 3 to drop printed drug filling instruction sheets into trays.

Shown next is various processing units provided in a drug storage room for processing drugs, non-drugs products and other items needed in hospitals.

Figure 7:
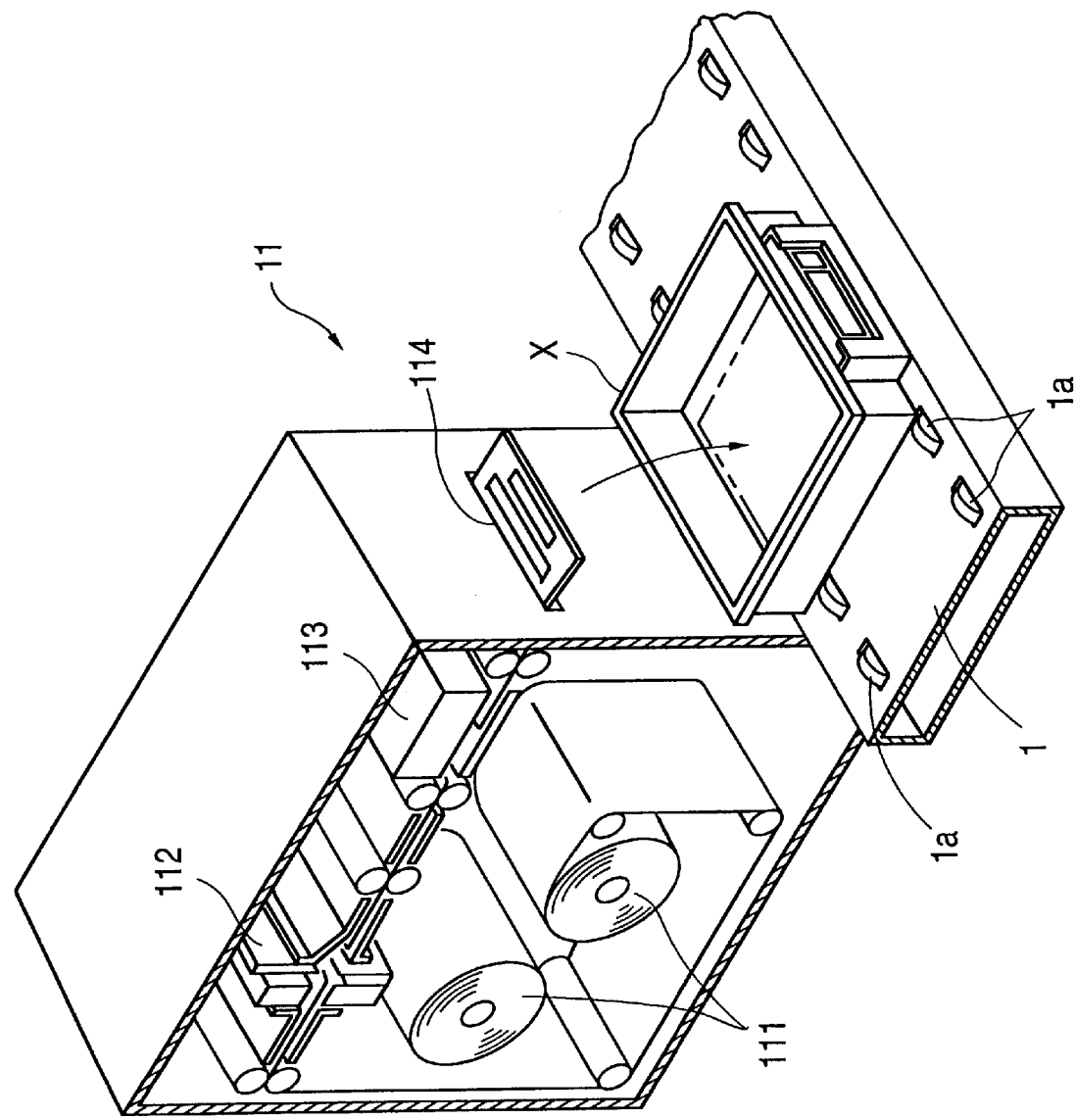
FIG. 7 is a partially cutaway, outer perspective view of the drug pouch printer 3.

FIG. 7 shows the outer appearance of a drug filling pouch printer 11. Rolls of printing paper 111 are set in the printer 11. The sheets of paper are unrolled, cut by a cutter 112 to a predetermined length, and bonded together to form drug filling pouches. After printing data by a printer 113 on the patient's name, how to take the medication, and other directions, each pouch is discharged through an opening 114 and dropped into a tray X.

Figure 8:
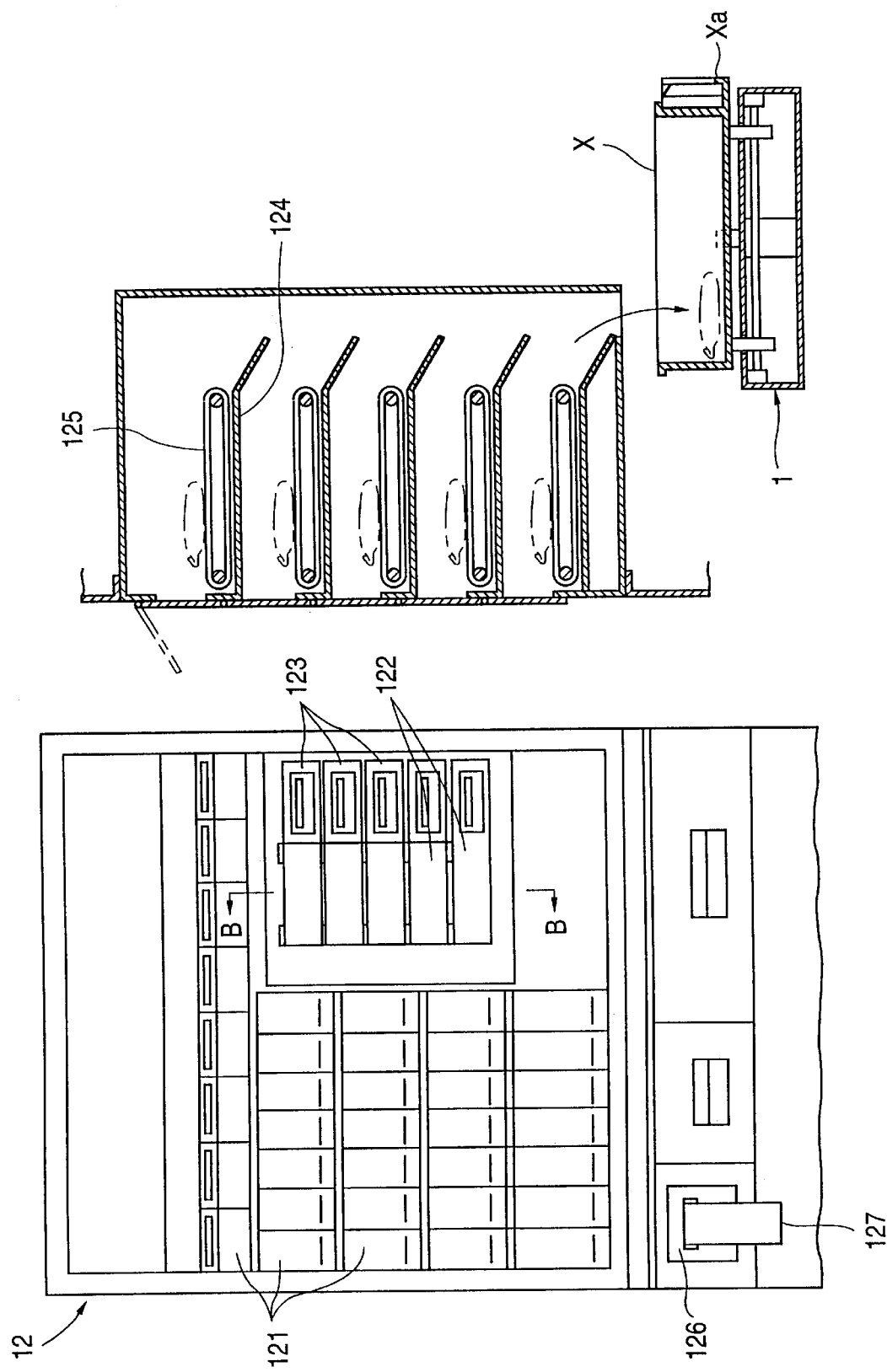
FIG. 8 is an outer functional diagram of drug processing units for various drugs such as powdered drugs, liquid drugs and tablets.

In the embodiment of FIG. 8, a unit which can be used as a processing unit for many different kinds of drugs is used as a powdered drug processing unit 2. FIG. 8A is its external perspective view. FIG. 8B is a section taken along line B—B of FIG. 8B. The processing unit 12 is used mainly to prepare PTP packed tablets but may be used to process other kinds of drugs. That is, this unit can be used to process tablets and liquid drugs in the later processing steps. Otherwise, processing units of this type may be provided for the respective steps to process different kinds of drugs independently of one another, as shown.

In this embodiment, drugs are stored in shelves 121. Necessary drugs are taken out of the corresponding shelves, prepared and put into a pouch. The pouch is then pushed through an opening 122 to store it in one of storage shelves 124 inside the opening 122, i.e. in the shelf 124 corresponding to the patient's name or patient code indicated on the indicator 123.

When a tray X for the corresponding patient being fed on the conveyor in the feed line arrives at the position under the shelf 124 that holds the pouch for this particular patient, a small conveyor 125 of this shelf 124 is activated to drop the pouch into the tray X.

Processing units 13 and 14, which are the same type as the processing unit 12, are used to process liquid drugs and tablets, respectively. That is, these units process liquid drugs and tablets and feed them into trays X. Pharmacists prepare these three kinds of drugs.

Figure 9:
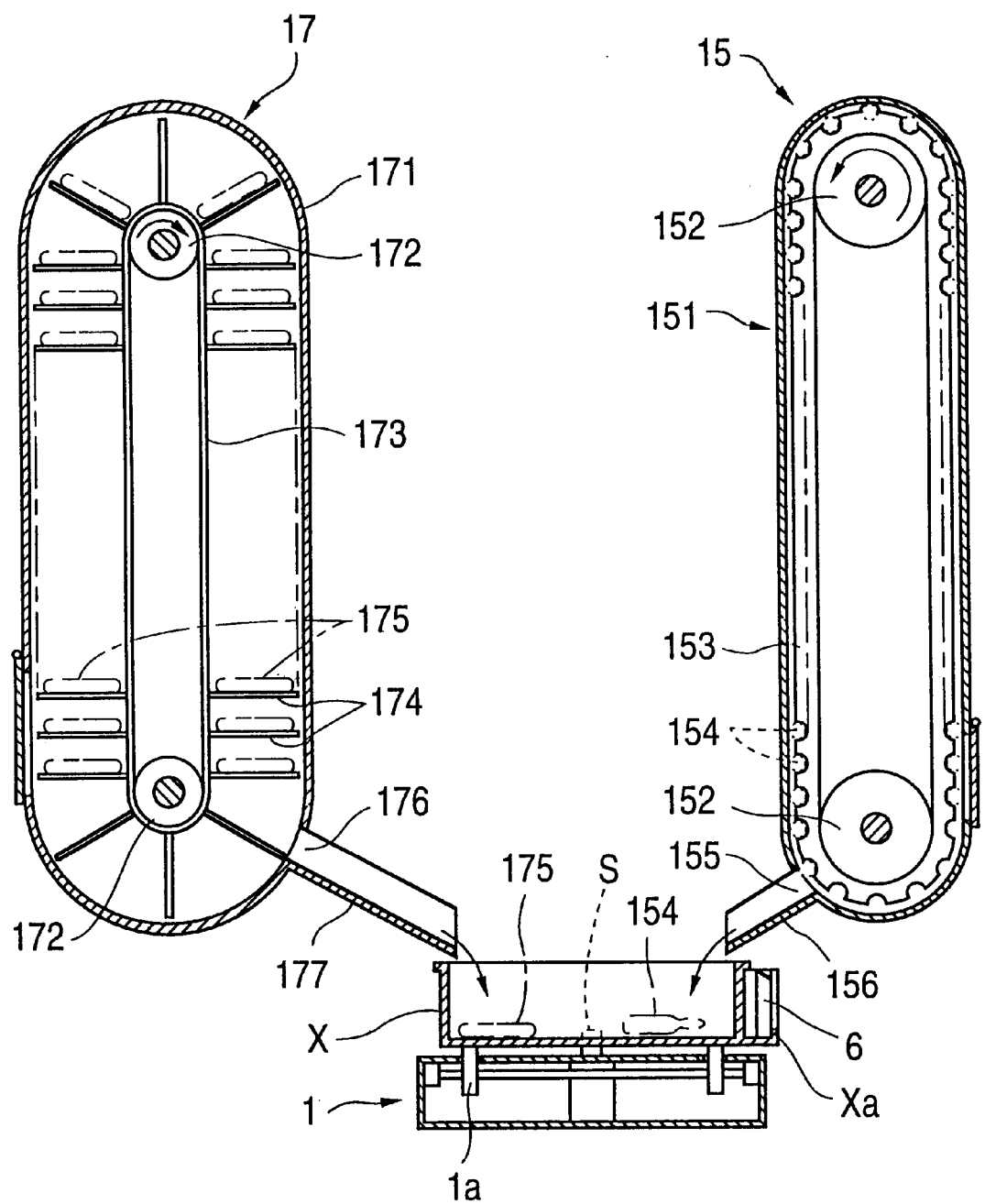
FIG. 9 is a schematic functional diagram of an ampule processing unit and an external drug processing unit.

FIG. 9 schematically shows an ampule processing unit 15 and an external application drug processing unit 17. The ampule processing unit 15 comprises a housing 151, two pulleys 152 provided in the housing 151, and an endless belt 153 connecting the pulleys 152. The endless belt has numerous recesses in the outer surface. Ampules 154 are received in these recesses.

The housing 151 has an opening 155 at its bottom. By slowly turning the endless belt 153, the ampules 154 are discharged one by one through the opening 155, roll on a guide plate 156, and drop into the waiting tray X.

The external drug processing unit 17 can process e.g. packed thick cloths to which is applied a fomentation. it has basically the same structure as the ampule processing unit 15. The only difference is that its belt 173 carries support plates 174 extending perpendicular from its outer surface. This unit comprises a housing 171 having an opening 176, pulleys 172, an endless belt having support plates 174 and a guide plate 177. External drugs 175 are supported on the support plates 174.

Figure 10:
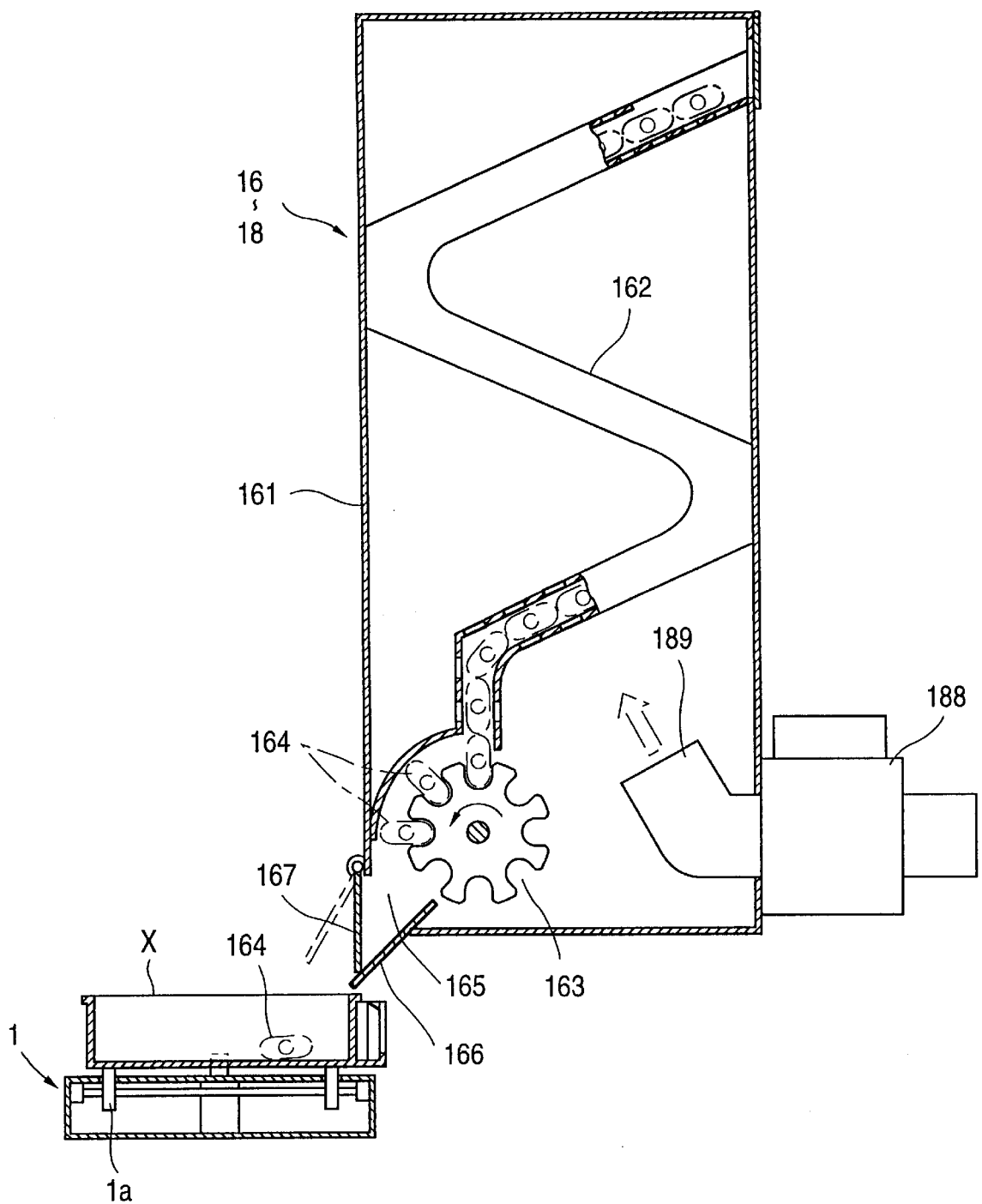
FIG. 10 is a functional diagram of a transfusion fluid processing unit or a refrigerated transfusion fluid processing unit.

FIG. 10 schematically shows a processing unit for processing transfusion fluids, some of which need refrigeration.

This processing unit 16 and 18 comprises a housing 161, a guide passage 162 that follows a winding path in the housing 161, and a rotary feed means 163 provided at the bottom end of the passage 162. Transfusion fluid bottles 164 in the passage 162 drop due to gravity one by one onto the feed means 164, rotating the feed means. By the rotation of the feed means 163, the bottles 164 are discharged one by one through an opening 165, slide on a guide plate 166, push the lid 167 open and drop into the tray X.

To use this processing unit as a processing unit 18 for processing transfusion fluids that need refrigeration, a cooling unit 18 is attached to the housing. Cool air discharged through a nozzle 189 is circulated in the housing. In the case of the processing unit 18 requiring refrigeration, top and bottom plates of a guide portion 182 are provided with small holes so that cool air can easily enter into the guide portion.

Figure 11:
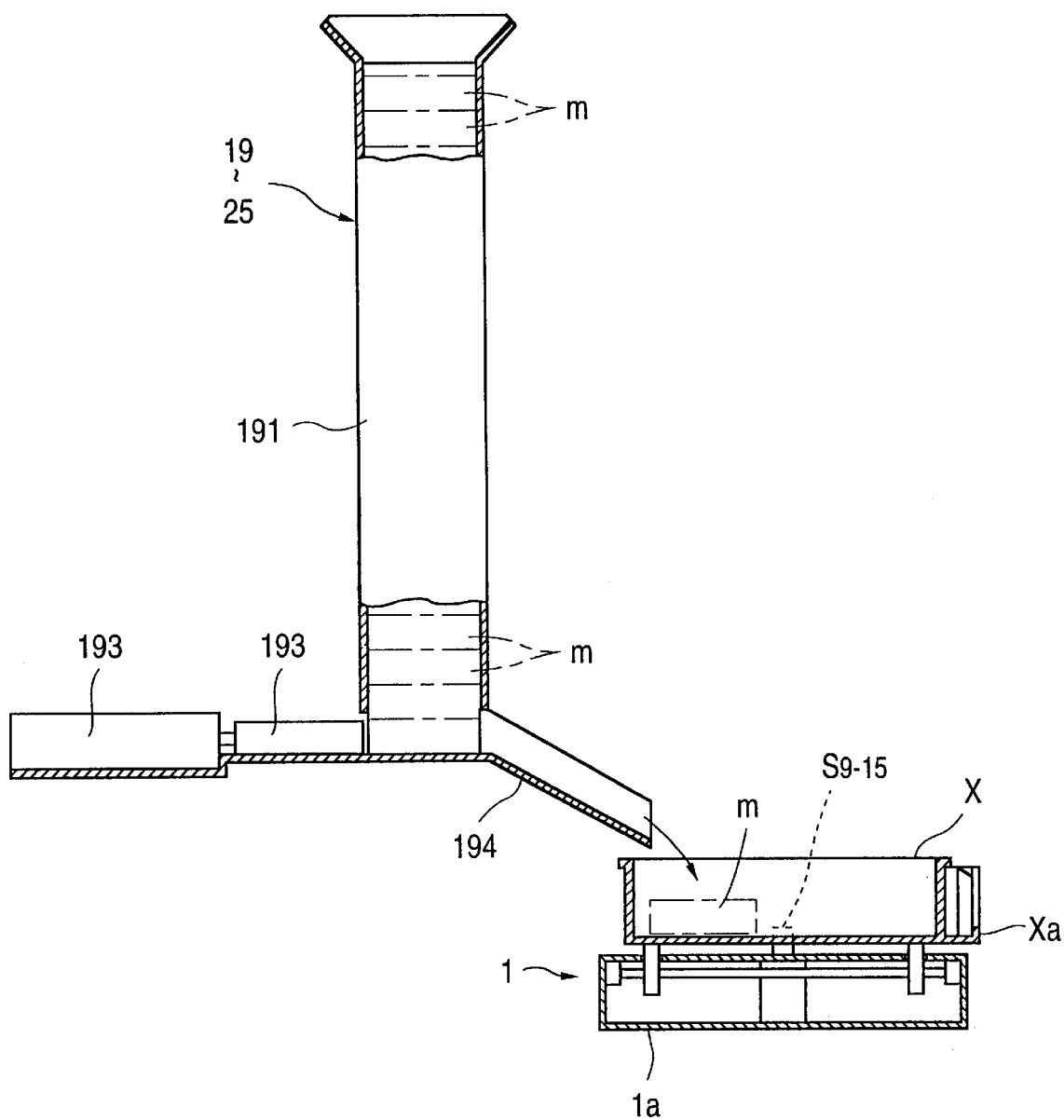
FIG. 11 is a functional diagram of a dressing container processing unit and processing units for processing various other articles.

FIG. 11 schematically shows a processing unit which is used for the containers 19–25. The single processing unit shown in FIG. 11 is used for the physiological expendable container 20, disinfecting cotton container 21, disposable container 22, medical instrument container 23, cutter container 24 and the container 25 for other items. Any of the above processing units processes packaged articles.

The dressing container 19 typically contains dressings, physiological expendable containers 20 store sanitary goods, disinfecting cotton container 21 contains absorbent cotton, disposable container 22 may contain injectors, medical instrument container 23 contains pus collecting trays, cutter container 24 typically stores scalpels and scissors. Other items in the container 25 are medical supplies such as catheters and hooks. Since the above processing units are exactly the same in structure, we will describe only the dressing container 19.

The dressing container 19 has a vertically oblong box-shaped housing 191. Articles m are piled one on another in the housing 191. They are pushed out horizontally one by one by an end member 193 of a cylinder 192, pass through a chute 194, and drop into the tray X.

Figure 12:
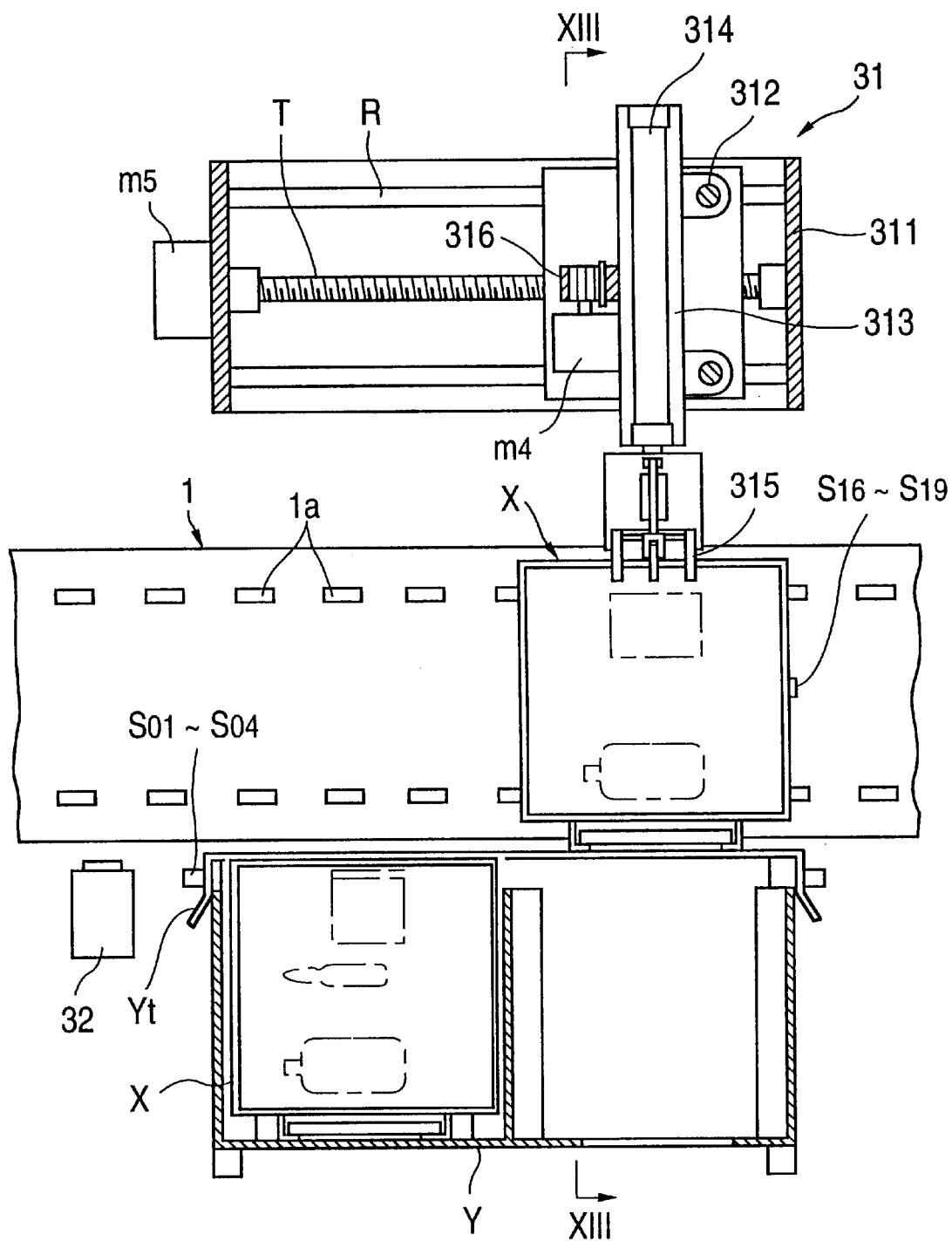
FIG. 12 is a partial plan view of a cart YA standing the distribution station.
Figure 13:
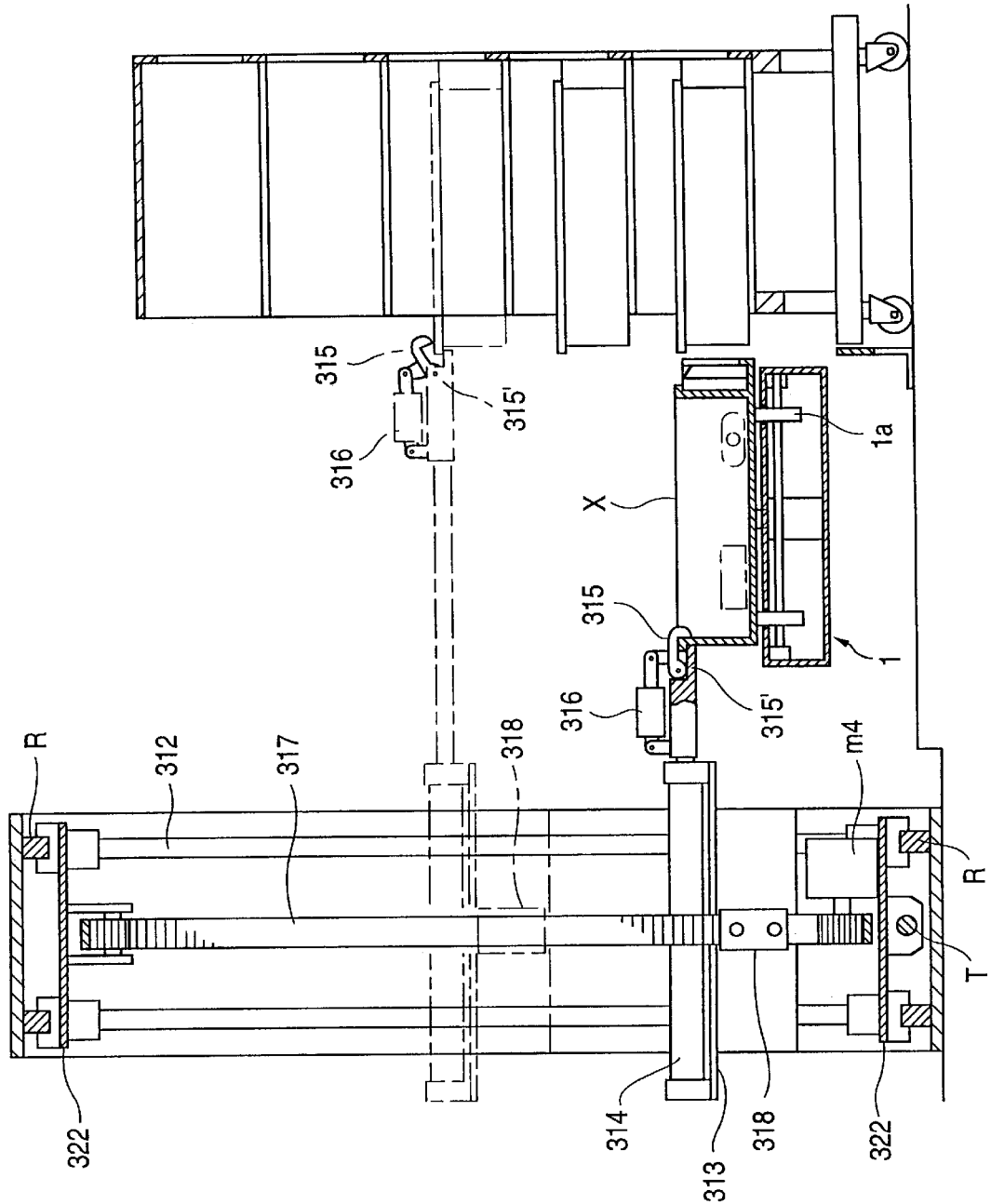
FIG. 13 is a sectional view taken along line VIII—VIII of FIG. 12.

FIGS. 12 and 13 show a part of the distribution station 30 provided at the terminal end of the feed path. A lifter 31 is provided to transfer trays X into a cart Y stopped across the conveyor from the lifter. As shown in FIG. 1, a plurality of such lifters 31 are provided in the distribution station 30. They transfer trays X into a plurality of carts Y assigned to a plurality of wards or departments in a hospital. After filling the carts with the necessary trays, they are sent to the respective departments. In the figures, we show only one lifter and one cart for simplicity.

The cart Y shown here is exactly the same as the one shown in FIGS. 3 and 4. The lifter 31 comprises a vertical frame 311 and vertical guide rods 312 fixed to the frame 311. A block 313 is vertically slidably mounted on the guide rods 312. The block 313 carries a hydraulic cylinder 314 having a tray gripper 315 at the free end of its piston. By moving the piston, the tray gripper 315 is moved horizontally. A tray X on the conveyor 1 is held between the tray gripper 315 and a tongue 315' by activating a solenoid 316. The tray X is lifted and inserted into a predetermined shelf of the waiting cart Y.

The block 313 is fastened to a belt 317 by a fastener 318. It is therefore moved up and down by driving the belt 317 with a motor m4. To transfer a tray X into each cart Y, the tray X is stopped at the position shown in FIG. 12 by the stoppers S16–S18, gripped by the tray gripper 315, and lifted up slightly. Then, the tray X is lifted up to the level of a predetermined shelf in the cart, while being moved horizontally to the position of the shelf.

In order to move each tray horizontally to the position of a predetermined shelf in the cart, an upper and a lower mounting plate 322 of the lifter 31 are slidably supported on top and bottom horizontal rails R extending parallel to the conveyor 1. By turning a threaded rod T meshing with the bottom of the lower mounting plate 322 with a motor m5, the mounting plates 322 and thus, the tray X can be moved horizontally along the conveyor 1. Thus, the tray can be inserted in any one of the shelves in the cart that are arranged in two columns and five rows.

According to this invention, the conveyor of the embodiment is controlled as follows:

When a tray for one patient is placed on the conveyor at the starting point, necessary items selected from drugs, non-drug articles and other drug-related items for this particular patient are put in the tray. A plurality of such trays are divided by departments and put in shelves of a plurality of waiting carts assigned to respective departments. When the carts are filled with trays, they are sent to the respective departments and distributed to the corresponding patients.

The following basic principle is followed to feed medications. That is, trays for respective patients are fed not in the order in which the patient data are entered in the host computer but on the first-ready-first-fed basis. Specifically, any medications in any processing unit that have been prepared first is fed first.

Figure 14:
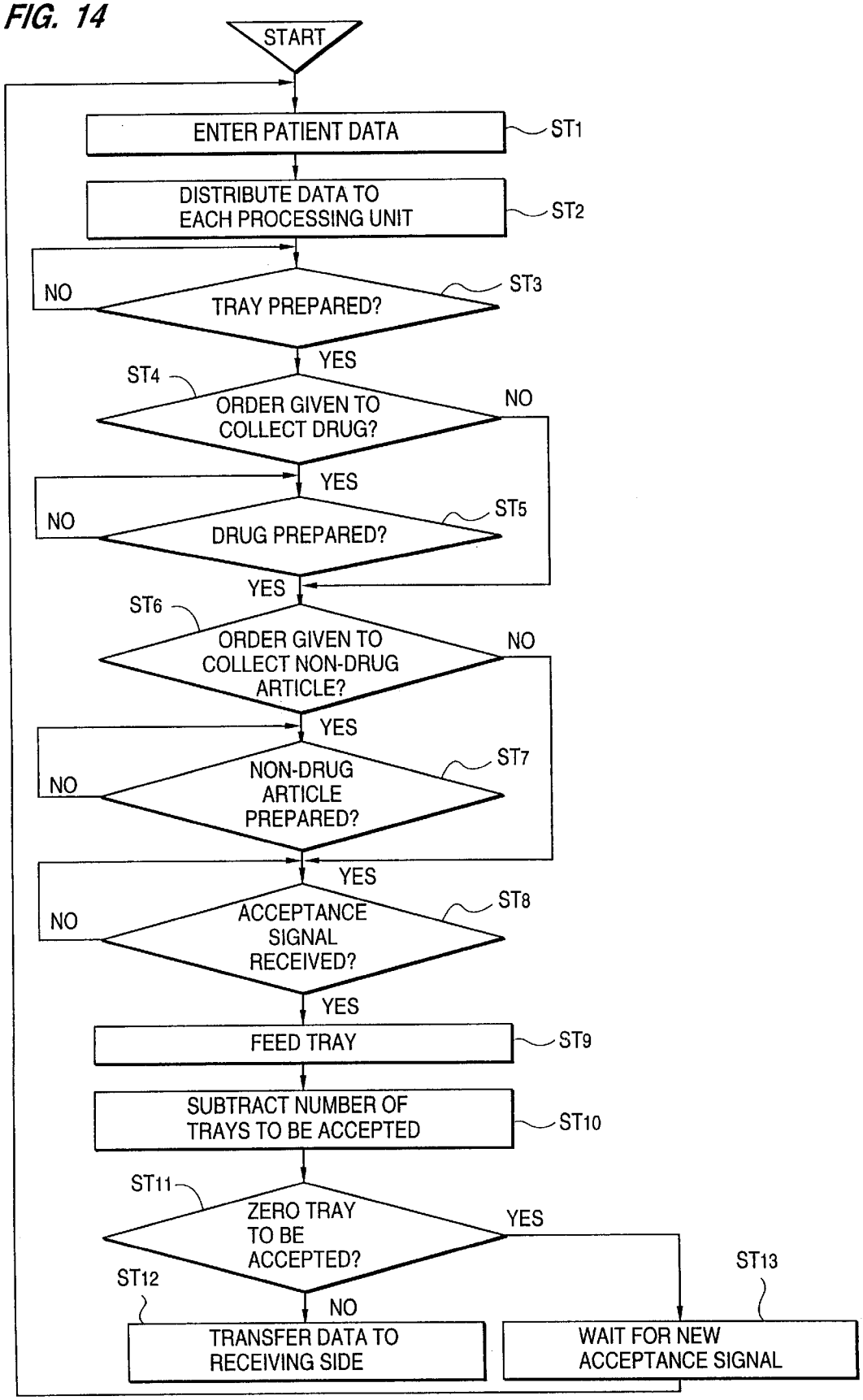
FIG. 14 is a flowchart showing the feed control of the entire feed line carried out by the host computer.

Now we describe in detail how the host computer 4 controls the conveyor with reference to the flowchart of FIG. 14.

When patient data is entered into the host computer 4 in Step ST1, the host computer 4 distributes this data to the sequencers (11a–25a) of the corresponding processing units 11–25 (Step ST2). The data is distributed, for example, as shown in Table 1.

In Table 1, the patient code numbers are shown in the order of entry. Letters A, B . . . D show the wards. Drug pouch printers, powdered drug processing units, etc. are shown in abbreviations. The figures in the column titled "complete" represent the order in which the drugs have been prepared.

As will be apparent from Table 1, it is not always the case that the drugs are prepared in the same order as the order of data entry. In the case shown in Table 1 for example, the drugs corresponding to the patient code 100211 have been prepared before the drugs corresponding to the patient code 201001. Every time drugs for one patient have been prepared in any processing unit, a completion signal is fed back to the host computer 4.

Every time the host computer 4 receives such a completion signal, one tray is prepared, provided that a cart Y is set in a predetermined position in the tray feed unit 2 and a plurality of trays X are stored in the cart Y.

Since the tray is set in position in this state, judgment is made that the tray has been prepared (YES in Step ST3). Thus, the program proceeds to the next step. If preparations in all of the processing units are completed, orders are given to collect drugs (YES in Step ST4), judgment is made that preparations for dispensing drugs are done (YES in Step ST5), orders are given to collect non-drug articles (YES in Step ST6), and judgment is made that preparations for dispensing non-drug articles are done (YES in Step ST7). The program thus proceeds to Step ST8 to check whether or not the host computer has received an acceptance signal, i.e. a signal that indicates whether or not the tray for the particular patient is acceptable in one of the carts YA–YD that corresponds to the mark symbolizing the hospital in which this patient is hospitalized.

As a general rule, the carts YA–YD are set in predetermined (original) positions in the distribution stations with no trays in their shelves. Since they can accept trays, acceptance signals are fed from sensors S01–S04 to the host computer 4 as soon as the carts YA–YD are set in position. The carts are now ready to accept trays.

When the host computer 4 receives the acceptance signals, the tray X is fed by the feed unit 2 (Step ST9). The host computer 4 then subtracts 1 from the maximum number of trays each cart Y can accommodate (80 in this embodiment), as shown in the righthand column of Table 1 (Step ST10). In the state of Table 1, trays 2, 69, 24 and 28 are set in the respective carts YA–YD.

Each of the trays, which have been fed one by one onto the conveyor every time drugs have been prepared in any processing units, have to be stopped at the corresponding processing unit to receive drugs. For this purpose, when the host computer 4 receives a tray feed signal, it commands the sequencer 5 for this particular processing unit to actuate one of the stoppers S1–S15 for this particular processing unit. The tray X thus stops at the predetermined processing unit.

Table 2 shows how the sequencers 5 operates. The figures in each column titled stoppers S1–S15 represent the number of the kinds of drugs to be fed into trays that have stopped at the stoppers S1–S15. In the state of Table 2, the drugs for the top patients (codes 100119 and 100182) have been finished, so that the corresponding counters in the distribution station (provided on the sequencers for driving the respective lifters) are decremented to the figures shown. For the third (code 20211) and subsequent patients, trays are now at the points indicated by shades. The tray for the lowermost patient (code 303112) is still standing by.

When many trays X are fed, the number of trays the cart YA can accept may eventually become zero (YES in Step ST11). For example, the completion order ⑥ in Table 1 is this case.

If this happens, since the cart YA cannot accept any more trays, the host computer stops feeding the tray destined for the cart YA in spite of the fact that drugs have already been prepared in the corresponding processing units. Thus, the originally seventh and eighth trays X are fed as the sixth and seventh trays. If this happens (YES in Step ST11), the program waits for a new acceptance signal in Step ST13.

In this case, a new empty cart YA has to be set after sending the full cart YA to the designated ward A. When the new empty cart YA has been set, the counter for the cart YA in the host computer 4 is reset and the maximum number of trays the cart can accept, namely 80, is set. As soon as the counter is reset, the originally sixth tray is fed onto the conveyor as the eighth tray X.

While the number of trays the intended cart can accept is not zero (NO in Step ST12), data on the tray being fed are transferred to the receiving side (Step ST12), and the same checks mentioned above are performed.

Figure 15:
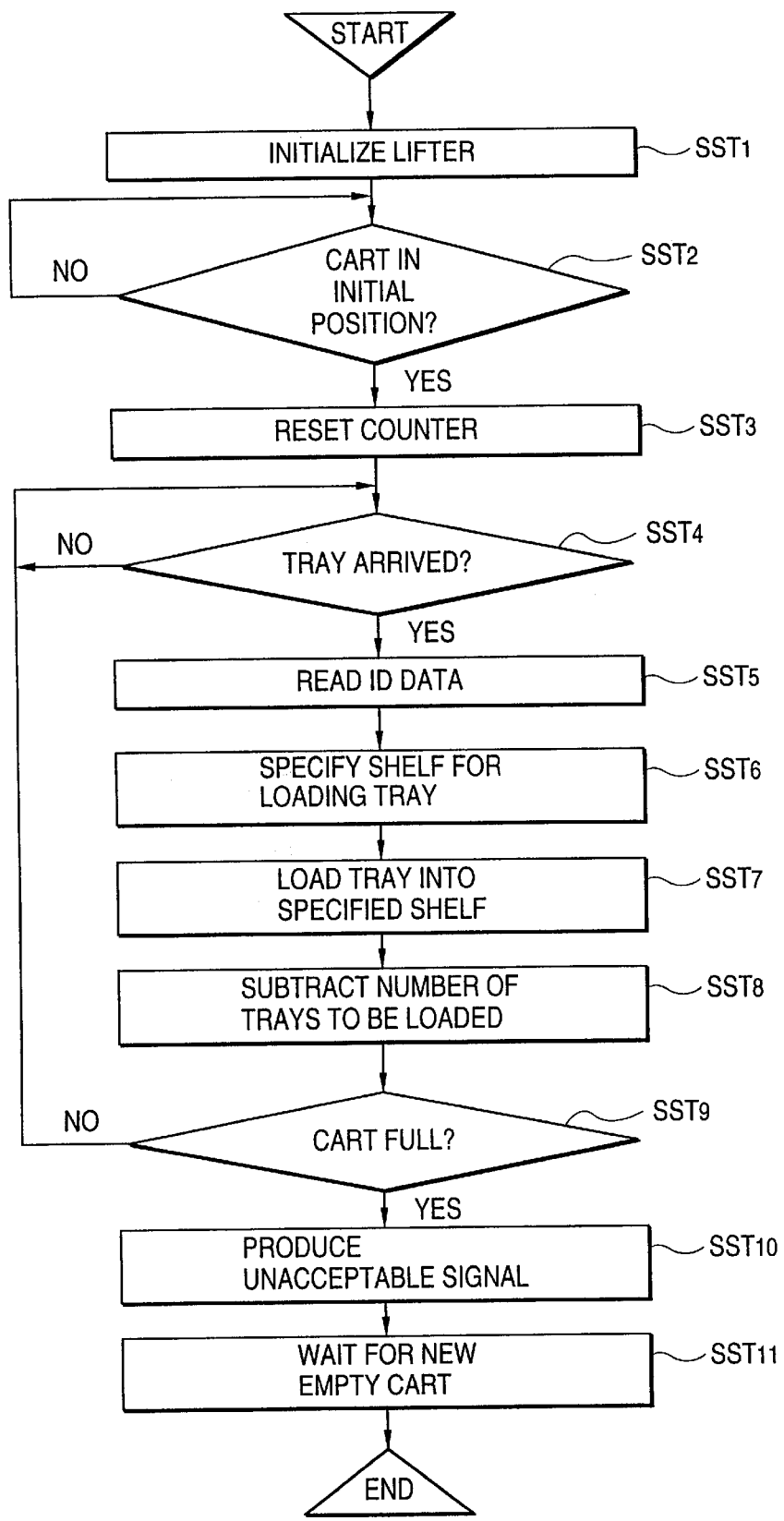
FIG. 15 is a flowchart showing how the liter and the cart are controlled by sequencers in the tray receiving unit.

Trays are loaded into each cart in the manner shown by the flowchart of FIG. 15. The lifters 21A–21D for loading trays X into the respective carts YA–YD and their sequencers 31a–31d are all of the same time, we will describe only the lifter 31A and its sequencer 31a. The other lifters and sequencers operate exactly the same way as the lifter 31A and sequencer 31a.

In Step SST1, the lifter 31A is initialized. More specifically, the tray gripper 315 is moved to a predetermined initial position. This position may be the position facing the shelf of the cart YA in the lowermost row and the left hand side column or any other position.

In Step SST2, the initial position of the cart YA is detected by one of the sensors S01–S04 to determine if the cart is initially set in a predetermined position. Then in Step SST3, the counters in the host computer 4 and the counters in the sequencers for controlling the respective carts are reset.

The carts YA–YD are now capable of accepting trays. Thus, when preparations have been made in the tray feed unit and the processing units, trays X are fed. In step SST4, confirmation is made of the arrival of each tray X. At the same time, determination is made on which one of the wards A–D the tray is to be delivered to.

The destination of each tray is determined by referring to the information on the tray X on the feed side corresponding to the tray X whose arrival at the loading point has been confirmed. The arrival of the tray is confirmed by reading the data stored in the ID indicator with an ID reader 32 shown in FIG. 12.

If the ID reader 22 is not used, the arrival of each tray is confirmed by an infrared sensor (not shown).

When the data in the ID indicator 6 has been read by the ID reader 22, this data are compared with the data from the tray feed side. If no errors are found, determination is made as to which shelf in the cart YA the tray is to be loaded in Step SST6. The shelves are specified for the individual trays to sort the trays by floors in a particular ward.

When the loading shelf has been specified, the tray X is picked up and loaded into the specified shelf by the lifter 31A. The counter in the sequencer 31a is then counted down by one in Step SST8. Every time the counter is counted down, it is determined whether the cart is full or not in Step SST9. If not, the program returns to Step SST4 to load another tray X into the cart.

When the cart YA becomes full of trays, a signal to this effect is produced in Step SST10. Then, the acceptance signal is replaced by an unacceptance signal in Step SST11. This state continues until a new, empty cart is set.

Figure 18:
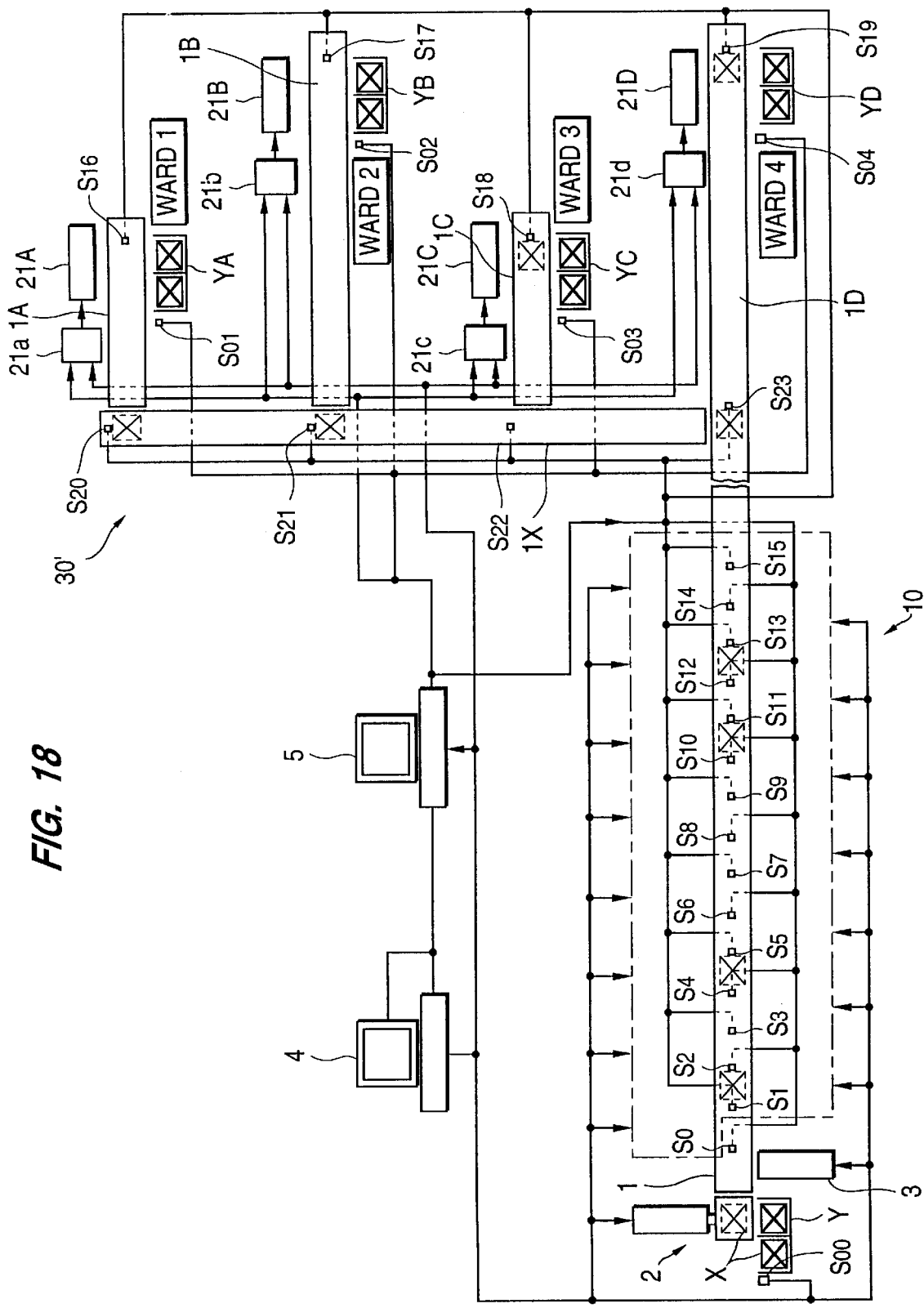
FIG. 18 is a block diagram of a feed control circuit of a second embodiment.
Figure 19:
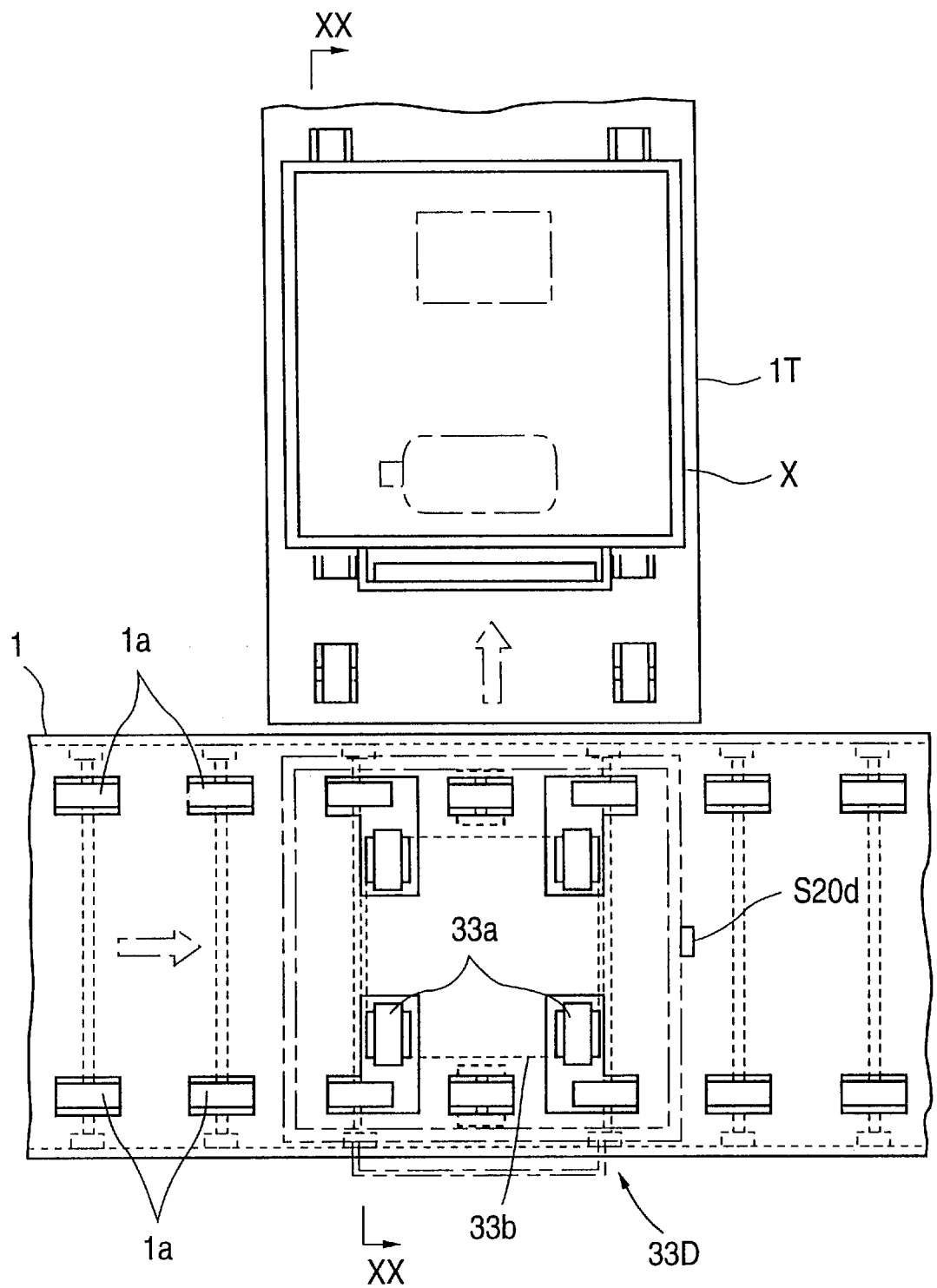
FIG. 19 is a detailed plan view of the feed line at its sorting position.

FIG. 18 and the following figures are block diagrams of the conveyor control circuit of the second embodiment. The tray feed mechanism and the processing units 10 of this embodiment are exactly the same as the first embodiment. But in this embodiment, the conveyor extends to respective wards of the hospital. A distribution station 30 is provided in each ward.

In this embodiment, each tray X that has received medications prepared in the processing units 10 is sorted and placed on a predetermined one of feed lines 1A–1D leading from the processing units 100 to different wards.

Figure 20:
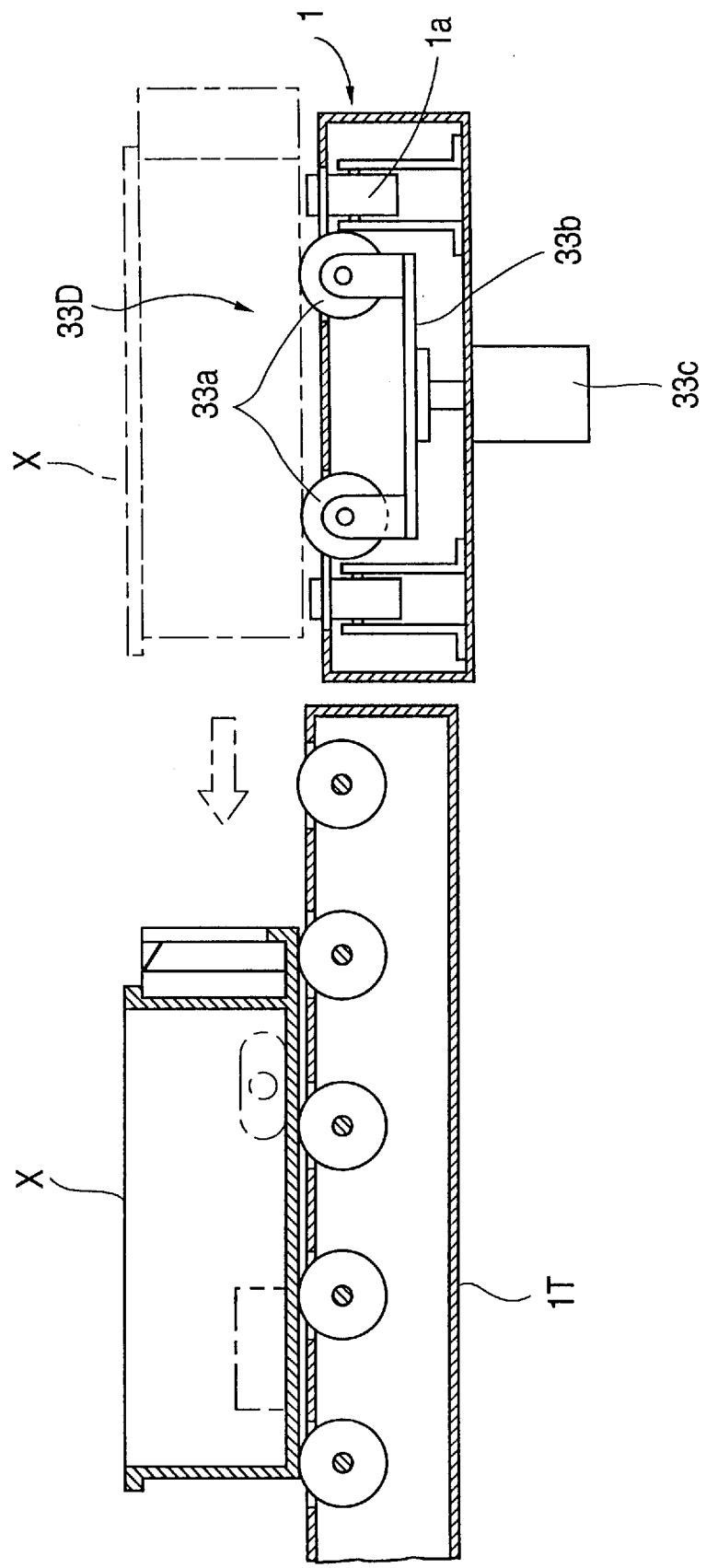
FIG. 20 is a sectional view taken along line XX—XX of FIG. 19.

FIGS. 17 and 18 show the detailed structure of the sorter 33D. The other sorters 33A, 33B and 33C are of the same structure. The sorter 33D is provided at the sorting position of the conveyor 1 and comprises feed rollers 33a for feeding trays X in the direction perpendicular to the direction of the conveyor 1, a support plate 33b and a cylinder 33c for vertically moving the support plate 33c (see FIG. 20).

The feed rollers 1a of the conveyor 1 are rotated by an unshown chain conveyor (by transmitting torque to one side of rotary shafts connecting the feed rollers 1a on both sides). But no such rotary shafts are present where the sorter is provided. A short chain conveyor is provided on the side opposite to the side where the above-mentioned chain conveyor is provided.

Each tray stopped by stopper S20d is fed transversely by a conveyor 1X intersecting the conveyor 1 at a right angle. When the tray X is stopped at one of the points where the conveyor 1X intersects the conveyors 1C–1A by one of stoppers S20–S23, it is moved from the conveyor 1X onto one of the conveyors 1C–1A by one of the sorters 33C–33A.

The operation after the tray X has arrived at the distribution station in the designated ward is the same as the first embodiment. Its description is therefore omitted.

Figure 21:
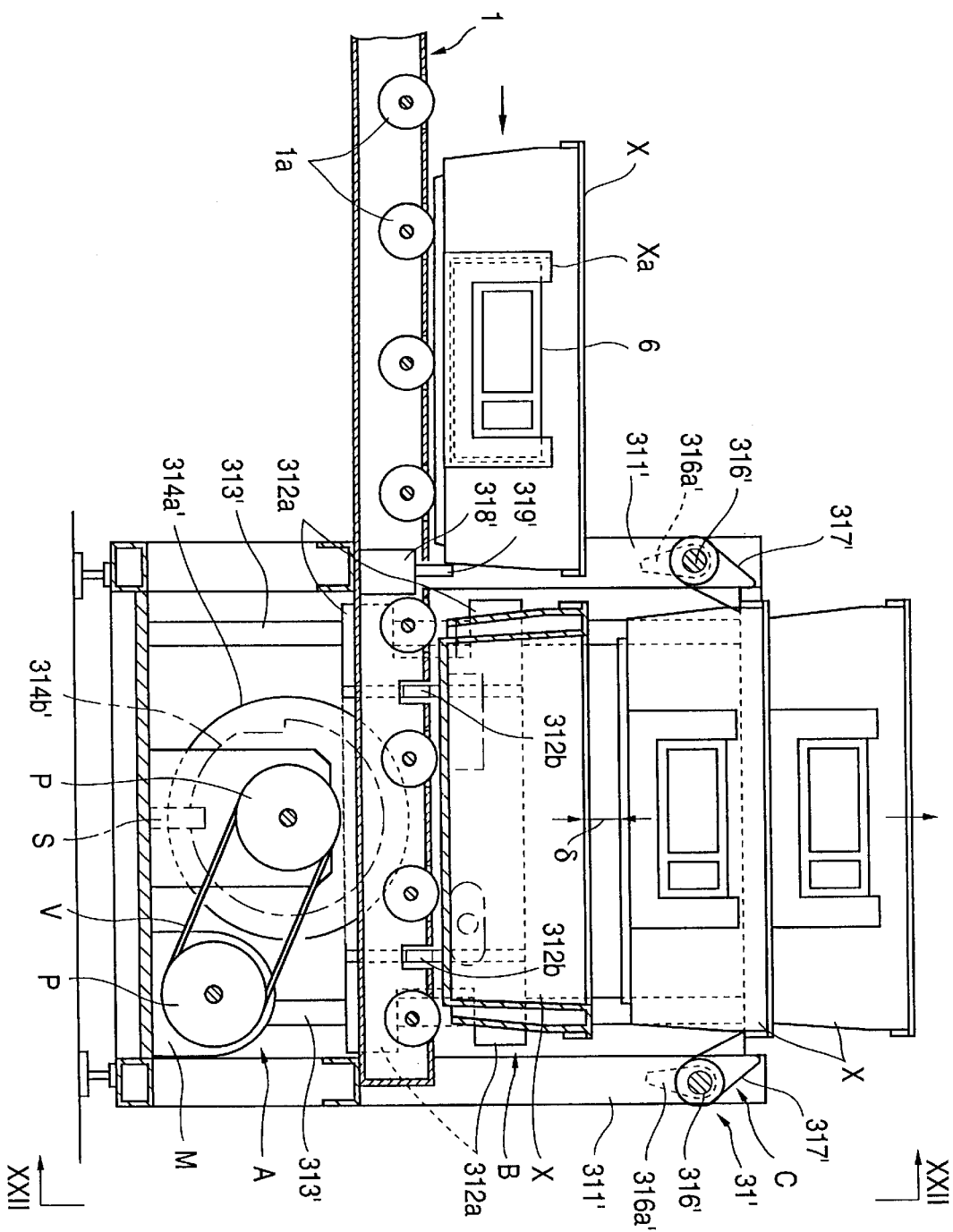
FIG. 21 is a side view of the tray storage unit.
Figure 22:
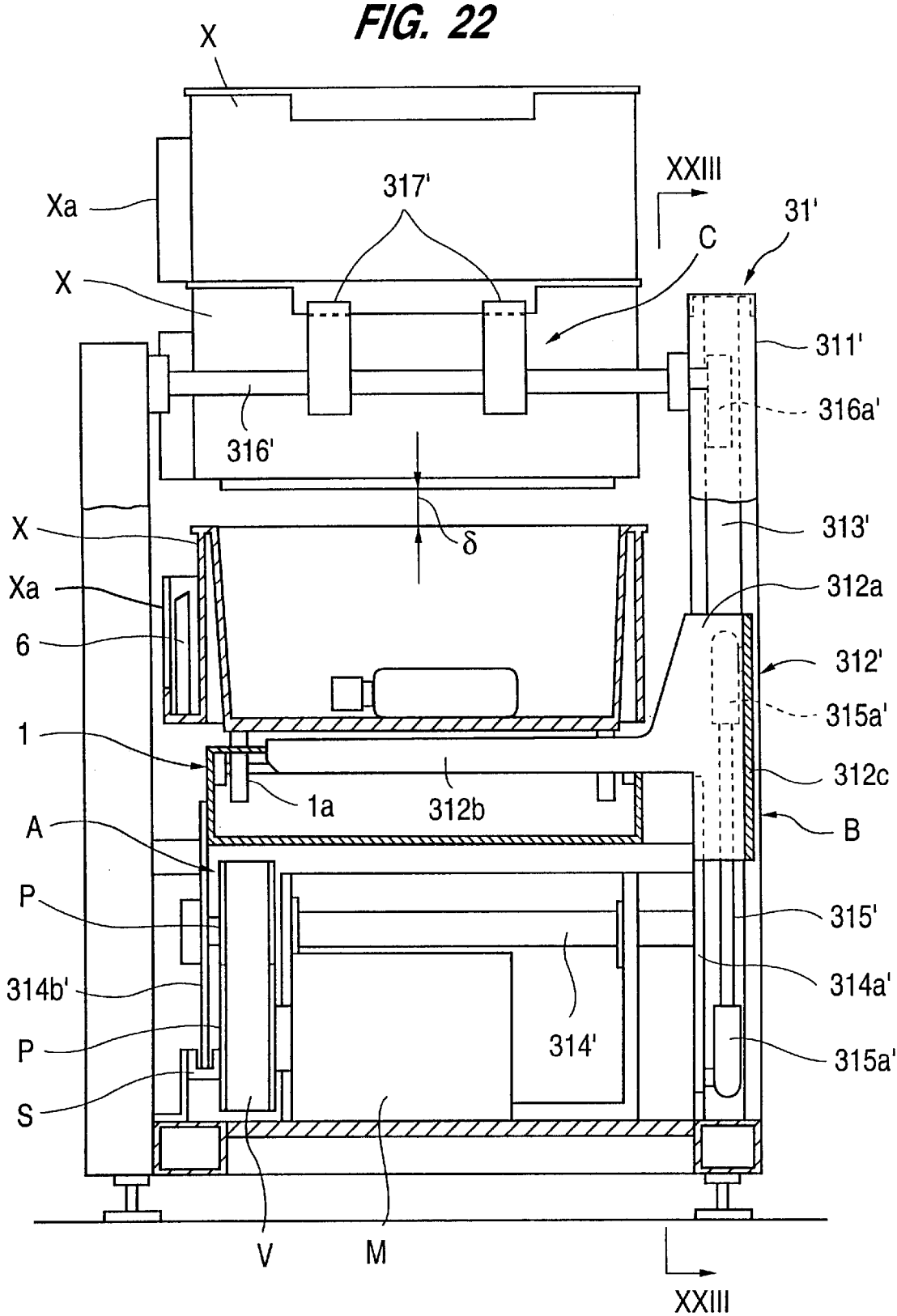
FIG. 22 is a side view taken along line XXII—XXII of FIG. 21.
Figure 23:
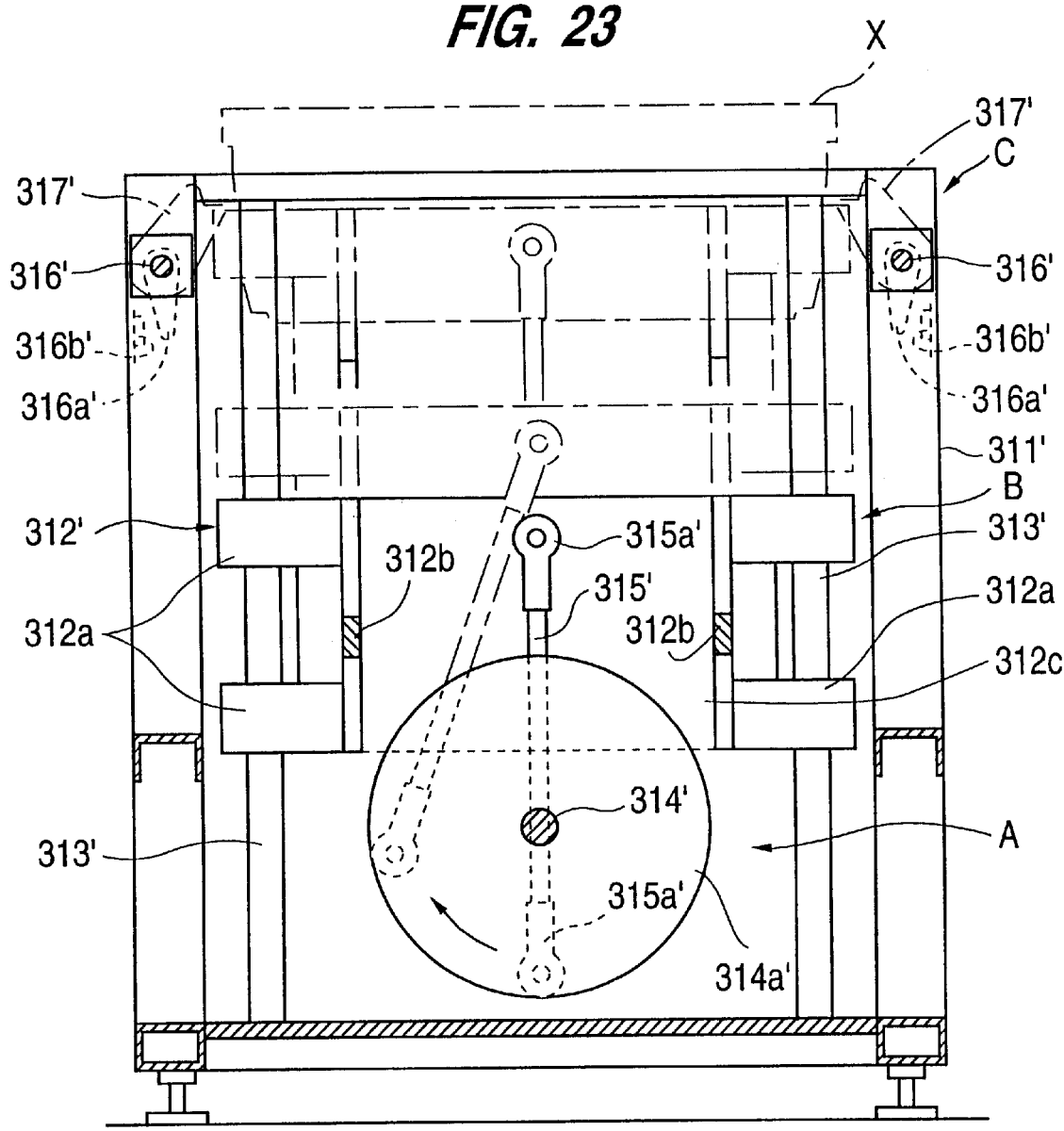
FIG. 23 is a side view taken along line XXIII—XXIII of FIG. 22.

FIGS. 21–23 schematically show an alternate embodiment, in which, instead of the carts Y, tray storage units are used to receive and store trays. In the first embodiment, trays X are automatically put in the waiting cart Y by the lifter 31 provided at the delivery end of the conveyor. In this second embodiment, instead of the lifter 31, a tray storage unit 31' is provided at the delivery end of the conveyor. Trays in the unit 31' are put in carts Y (not shown) or other containers with caster wheels and are delivered to respective wards.

The tray storage unit 31' comprises a tray lifting mechanism B with a cantilever arm 20 for lifting trays X, a driving unit A for driving the tray lifting mechanism B, and a tray holder unit c having pivotable claws for stacking and holding trays X. The tray lifting mechanism B comprises vertical frames provided at four corners of a parallelogram and coupled together by horizontal frames, vertical guides 313' provided adjacent the respective vertical frames, and tray lifting units 312' vertically slidably mounted on the vertical guides 313' for lifting trays X in a cantilever manner.

The tray lifting unit 312' comprises a pair of members each including base portions 312a and a tray support arm 312b integral with the base portions 312a and extending in a cantilever manner, and a plate 312c coupling the pair of members together.

The driving unit A comprises a motor M provided under the frame structure, a rotary shaft 314' rotatably mounted on a stationary member and coupled to the output shaft of the motor M through a pulley P, a belt V and another pulley P, a rotary disk 314a' connected to one end of the rotary shaft 314', and a crankshaft 315' having one end thereof coupled to the rotary plate 314' by a coupling member 315a' and the other end to the plate 312c of the tray lifting unit 312' by another coupling member 315a'.

Another rotary disk 314b' is coupled to the other end of the rotary shaft 314' to count the number of revolutions of the rotary shaft 314', i.e. the number of times trays X are moved up and down by the tray lifting mechanism B. The disk 314b' detects the number of revolutions in cooperation with a light sensor S provided under the disk 314b'. Specifically, the disk 314b' has a cutout (hook portion shown by two-dot chain line) which is detected by the sensor S every time it passes by the sensor S. The number of revolutions is detected by counting the number of times the cutout passes by the sensor S with a counter (not shown).

As shown in FIGS. 21 and 22, at a standby state, the tray lifting unit 312' is at a position where the top surfaces of the tray support arms 312b are slightly lower than the bottom of the tray X. When the tray X is moved onto the unit 312', it is raised by the tray support arms 312b to a predetermined level. The tray holding unit C is provided at this level to hold the tray at the level.

The tray holding unit C includes two rods 316' extending between vertical side frames of the conveyor 1 at the front and rear ends of the tray storage position. Each rod 316' carries two claws 317', and at one end thereof a stopper lever 316a' and a stopper 316b, fixed to the vertical frame.

Each tray X has, on the outer periphery thereof, an edge with which the claws 317' engage. The height of the rods 316' and the claws 317' is adjusted so that each tray X is raised to such a level that an enough space δ is provided into which the next tray X can be inserted.

A stopper (cylinder) 318' is provided at the rear end of the tray storage unit 31' to prevent the next tray X from coming into the storage area while the first tray X is being lifted. The next tray X is stopped by a stopper rod 319' protruding from the top surface of the conveyor 1.

The tray lifting mechanism B converts the rotary driving force of the driving unit A into a vertical linear movement to raise each tray X on the conveyor to a predetermined level. The tray is then gripped by the tray holder C.

As shown in FIG. 23, each tray X is pushed up by the tray lifting mechanism B to the highest level shown by the two-dot line, while pushing open the tips of the claws 317' outwardly with the top edge of the tray X to clear the claws.

Then, when the lifting mechanism B begins to descend, the tray also descends by its own weight until its edge engages the tips of the claws 317'. The tray is thus held at a predetermined level by the claws 317'. The lifting mechanism B further descends to the above-described standby position to wait for the arrival of the next tray.

When a tray X is raised with another tray X held by the claws 317', the lower tray is raised while pushing up the upper tray, and then lowered until its edge engages the claws 317'. Now two trays are held by the claws 317'. By repeating this operation, a plurality of trays can be stacked one on another.

When a predetermined number of trays are stacked, they are lifted by a suitable means and transferred into a cart or any other wheeled container to deliver drugs in the trays to respective wards.

What is claimed is:

1. An apparatus for dispensing drugs and other medical supplies, said apparatus comprising:

a feed line having a first end and a second end, wherein said feed line is either a straight or looped type of feed line;

a carrier feed unit provided at said first end of said feed line for depositing carriers for respective patients onto said feed line such that the carriers are fed on said feed line;

a plurality of processing units provided along said feed line for preparing and dispensing the drugs and the other medical supplies into the carriers being fed on said feed line;

a plurality of carrier receiving units provided at said second end of said feed line for receiving the carriers being fed on said feed line;

a control unit for controlling said plurality of processing units, based on a name or code of a patient and based on the drugs and the other medical supplies prescribed for the patient, so as to prepare the drugs and other medical supplies prescribed for the patien,t in selected ones of said plurality of processing units;

means for sending to said control unit a first signal indicating that a preparation of the drugs and the other medical supplies prescribed for the patient has been completed in the selected ones of said plurality of processing units;

means for sending to said control unit and receives a second signal indicating that one of said plurality of carrier receiving units designated for the patient can receive a carrier corresponding to the patient;

wherein said control unit, in response to receiving said first and said second signals, activates said carrier feed unit to deposit the carrier corresponding to the patient on said feed line, whereby the carrier is fed on said feed line while collecting the drugs and the other medical supplies prescribed for the patient which are dispensed from the selected ones of said plurality of processing units, and whereby the carrier is then received in the one of said plurality of carrier receiving units designated for the patient.

2. An apparatus as claimed in claim 1, wherein the carriers for respective patients are fed in the order in which preparations for feeding the carriers, preparations for the drugs and the other medical supplies in said plurality of processing units, and preparations for receiving the carriers for respective patients at said plurality of carrier receiving units are completed, and wherein each of the carriers for respective patients is received in one of said plurality of carrier receiving units based on the name or code of the patient which is stored in said control unit.

3. An apparatus as claim ed in claim 1, further comprising means for attaching an indicator, which stores the name or code of the patient and drug preparation data, to each of the carriers at said first end of said feed line, means provided near said second end of said feed line for reading the data stored in each of the indicators, and means for loading each of the carriers into a predetermined one of said plurality of carrier receiving units at a position based upon the data stored in each of the indicators.

4. An apparatus as claimed in claim 2, further comprising means for attaching an indicator, which stores the name or code of the patient and drug preparation data, to each of the carriers at said first end of said feed line, means provided near said second end of said feed line for reading the data stored in each of the indicators, and means for loading each of the carriers into a predetermined one of said plurality of carrier receiving units at a position based upon the data stored in each of the indicators.

5. A method for dispensing drugs and other medical supplies using an apparatus which comprises a feed line having a first end and a second end, a carrier feed unit, a plurality of processing units provided along the feed line, a plurality of carrier receiving units provided at the second end of the feed line, and a control unit for controlling the plurality of processing units, said method comprising:

depositing carriers for respective patients onto the feed line at the first end of the feed line using the carrier feed unit such that the carriers are fed on the feed line;

preparing and dispensing the drugs and the other medical supplies into the carriers being fed on the feed line using the plurality of processing units;

receiving the carriers being fed on the feed line using the plurality of carrier receiving units; and controlling the plurality of processing units, based on a name or code of a patient and based on the drugs and the other medical supplies prescribed for the patient, so as to prepare the drugs and other medical supplies prescribed for the patient in selected ones of the plurality of processing units;

sending to the control unit a first signal indicating that a preparation of the drugs and the other medical supplies prescribed for the patient has been completed in the selected ones of the plurality of processing units;

sending to the control unit a second signal indicating that one of the plurality of carrier receiving units designated for the patient can receive a carrier corresponding to the patient; and wherein the control unit, in response to receiving the first and the second signals, activates the carrier feed unit to deposit the carrier corresponding to the patient on the feed line, whereby the carrier is fed on the feed line while collecting the drugs and the other medical supplies prescribed for the patient which are dispensed from the selected ones of the plurality of processing units, and whereby the carrier is then received in the one of the plurality of carrier receiving units designated for the patient.

6. A method as claimed in claim 5, wherein the carriers for respective patients are fed in the order in which preparations for feeding the carriers, preparations for the drugs and the other medical supplies in the plurality of processing units, and preparations for receiving the carriers for respective patients at the plurality of carrier receiving units are completed, and wherein each of the carriers for respective patients is received in one of the plurality of carrier receiving units based on the name or code of the patient which is stored in the control unit.

7. A method as claimed in claim 5, further comprising:

attaching an indicator, which stores the name or code of the patient and drug preparation data, to each of the carriers at the first end of the feed line;

reading the data stored in each of the indicators;

loading each of the carriers into a predetermined one of the plurality of carrier receiving units at a position based upon the data stored in each of the indicators.

8. A method as claimed in claim 6, further comprising:

attaching an indicator, which stores the name or code of the patient and drug preparation data, to each of the carriers at the first end of the feed line;

reading the data stored in each of the indicators;

loading each of the carriers into a predetermined one of the plurality of carrier receiving units at a position based upon the data stored in each of the indicators.

* * * * *